US006535479B1

(12) United States Patent
Ikematsu

(10) Patent No.: US 6,535,479 B1
(45) Date of Patent: Mar. 18, 2003

(54) HITLESS SWITCHING SYSTEM OF ATM SWITCH APPARATUS IN WHICH DISCARD PRIORITY CONTROL IS STOPPED

(75) Inventor: Ryuichi Ikematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/197,680

(22) Filed: Nov. 23, 1998

(30) Foreign Application Priority Data

Nov. 28, 1997 (JP) .............................................. 9-344043

(51) Int. Cl.[7] .............................................. G01R 31/08
(52) U.S. Cl. ........................ 370/220; 370/219; 370/217
(58) Field of Search ................................ 370/219, 217, 370/218, 220, 221, 225, 228, 230, 235, 237, 242, 244, 248, 252, 351, 352, 353, 354, 360, 398, 395.2, 395.32, 395.71, 395.72, 412, 413, 417, 428

(56) References Cited

U.S. PATENT DOCUMENTS 5,274,641 A * 12/1993 Shobatake et al. .......... 370/392
5,283,782 A * 2/1994 Takase et al. ............... 370/398

* cited by examiner

Primary Examiner—Douglas Olms
Assistant Examiner—Phirin Sam

(57) ABSTRACT

A hitless switching system in an asynchronous transfer mode (ATM) apparatus, includes a first system switch section and a second system switch section. The first system switch section has a first cell buffer, and sequentially stores a sequence of cells in the first cell buffer to sequentially output the stored cells from the first cell buffer while performing a discard priority control to the sequence of cells. Also, the first system switch section stops the discard priority control when a switching control cell is detected in the sequence of cells. The second system switch section has a second cell buffer, and sequentially stores the input cells in the second cell buffer to sequentially output the stored cells from the second cell buffer while performing the discard priority control to the sequence of cells. When the switching control cell is detected in the input cell, the second system switch section stops the discard priority control and discards the stored cells from the second cell buffer together with the switching control cell.

17 Claims, 14 Drawing Sheets

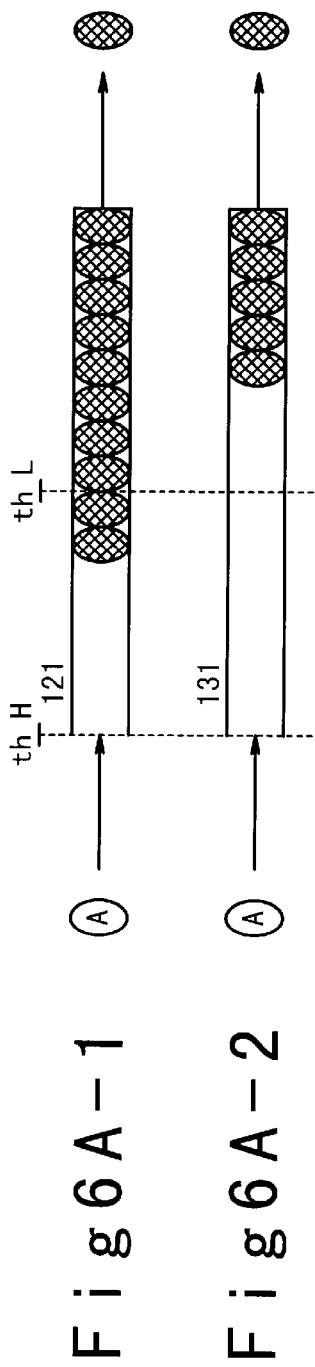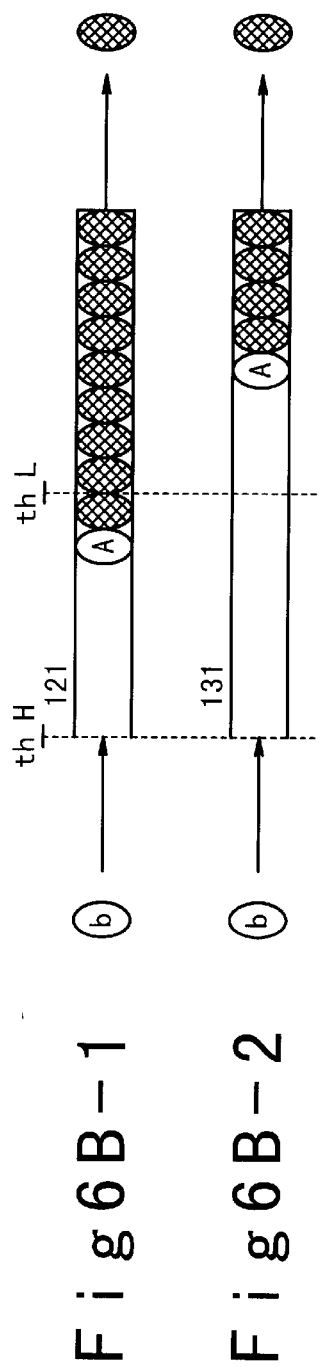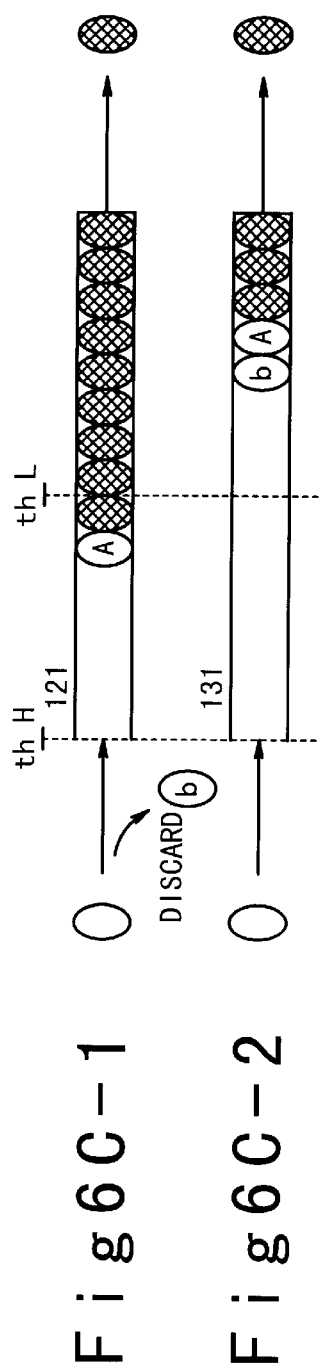

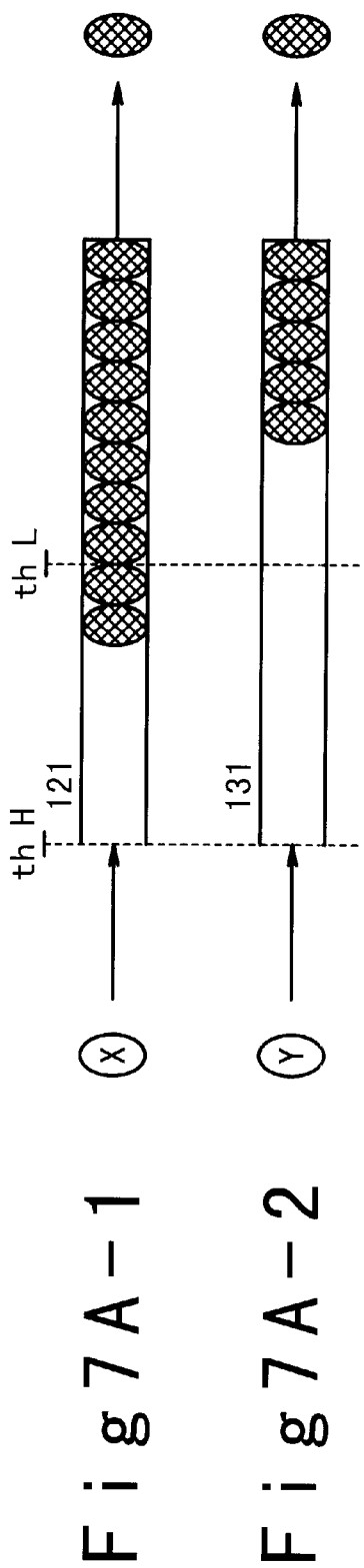
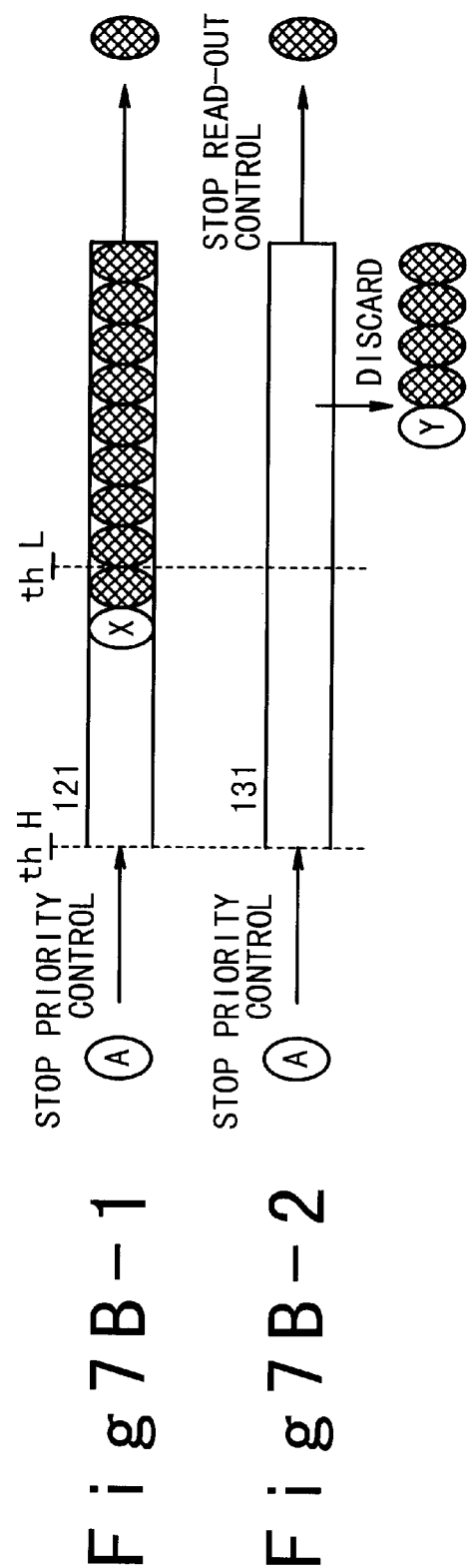

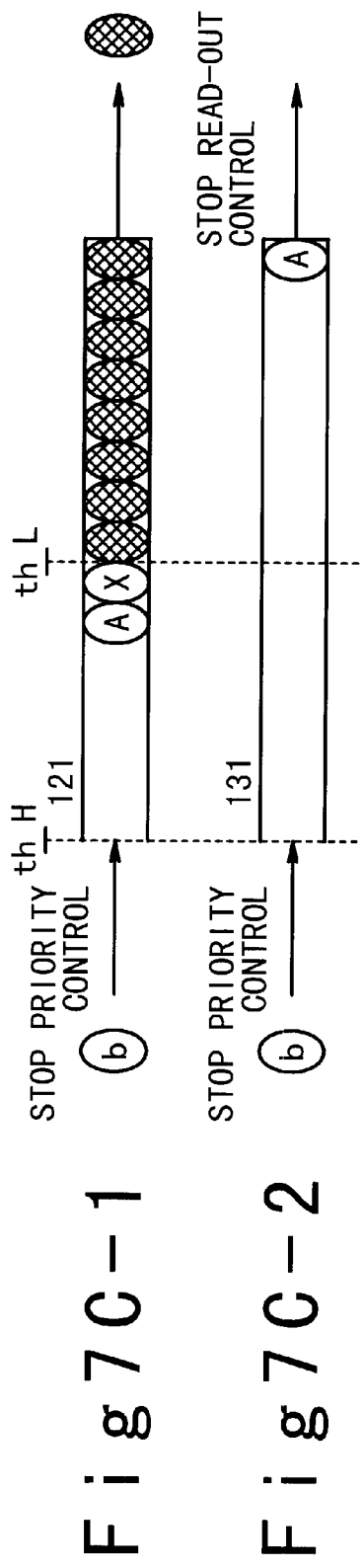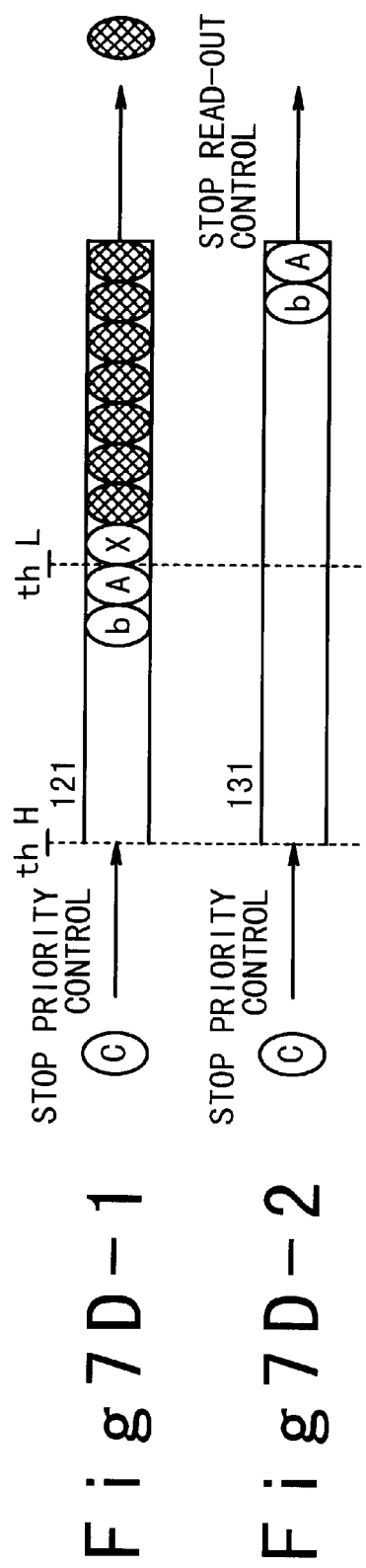

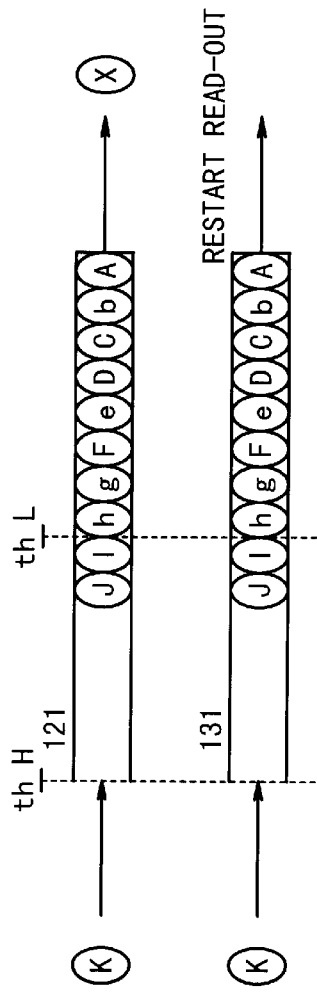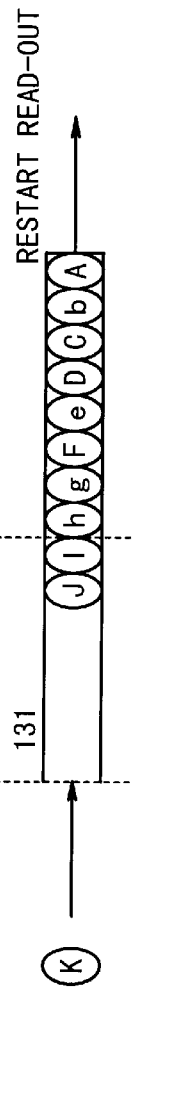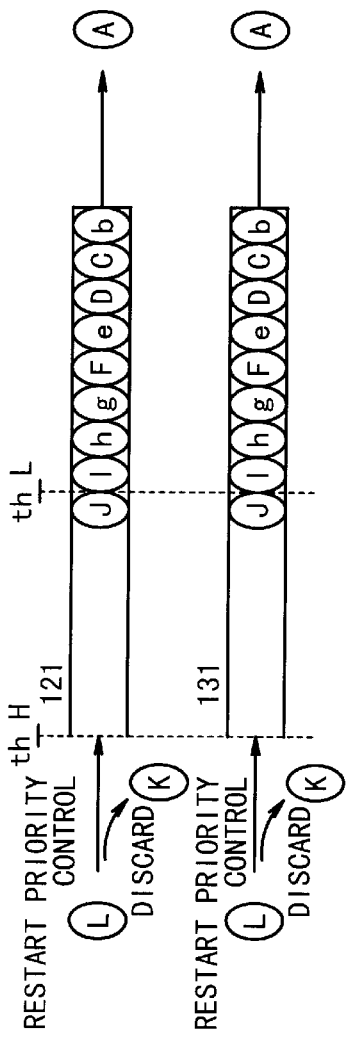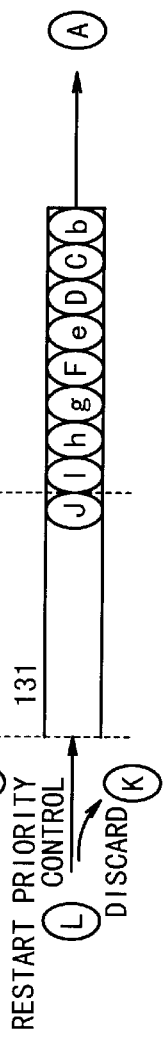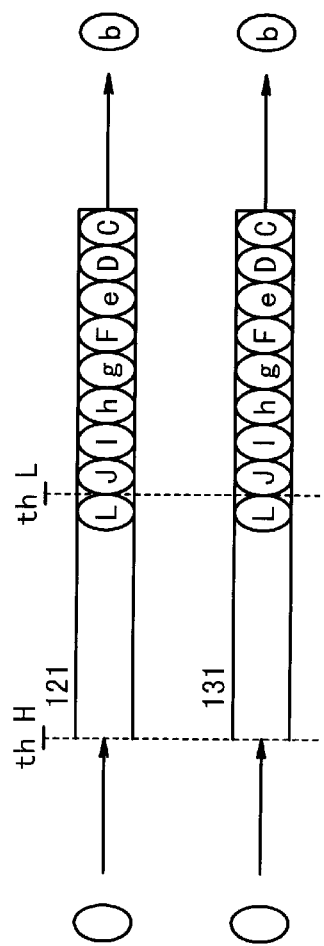

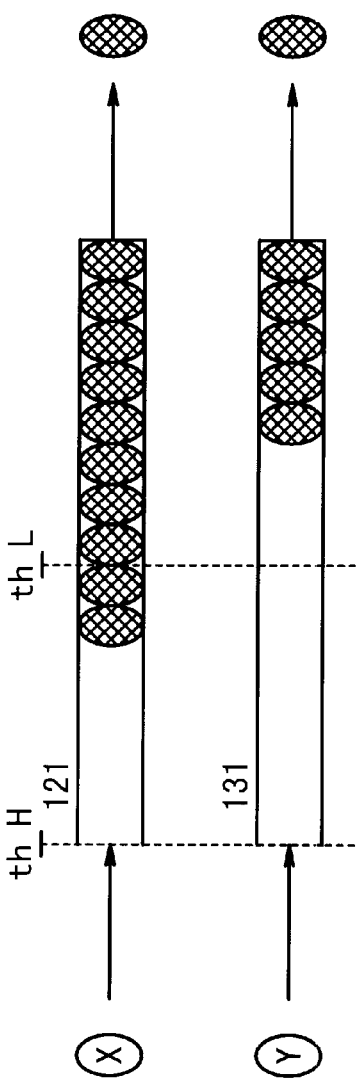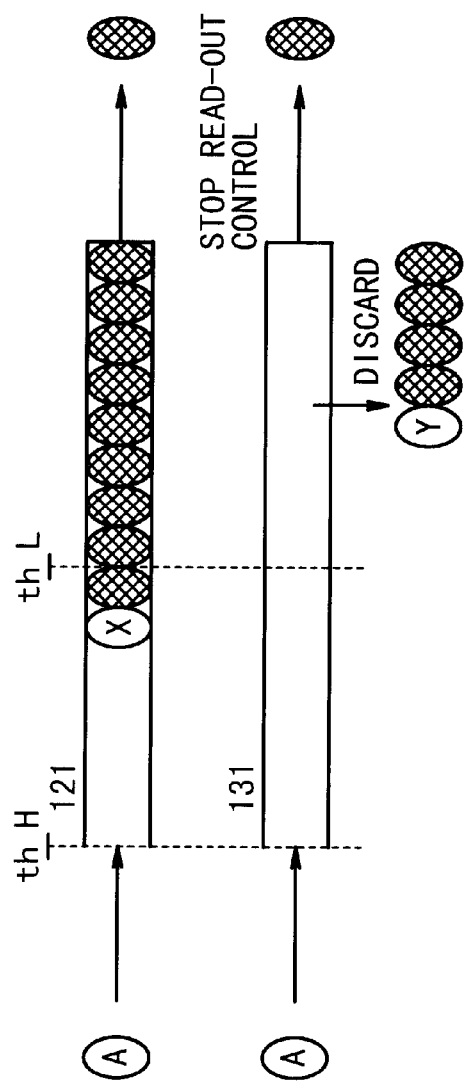

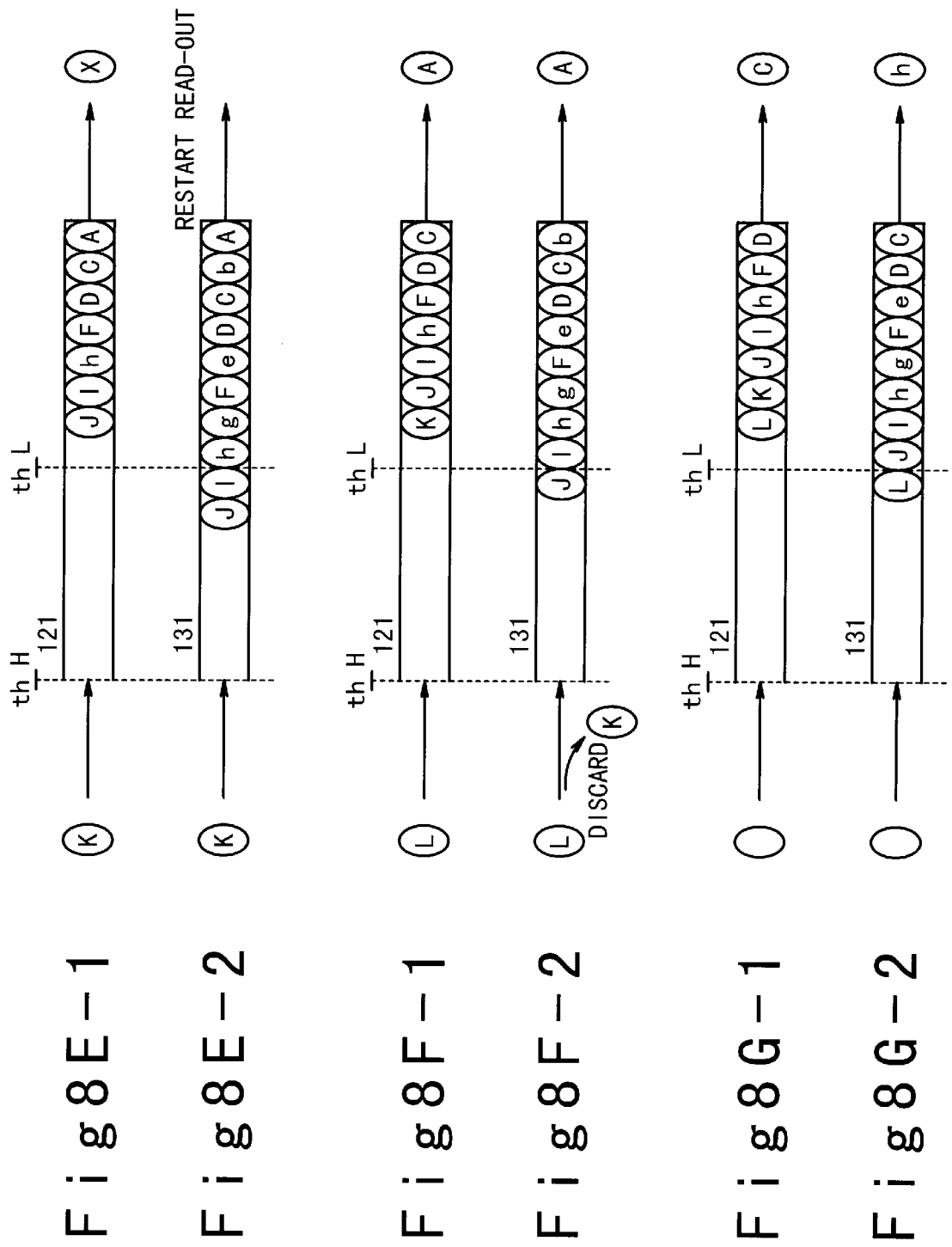

HITLESS SWITCHING SYSTEM OF ATM SWITCH APPARATUS IN WHICH DISCARD PRIORITY CONTROL IS STOPPED

BACKGROUND OF THE INVENTION

1. Field of the Invention

The present invention relates to a hitless switching system of an ATM switch, and more particularly to a hitless switching system of an ATM switch which has a discard priority control function.

2. Description of the Related Art

A first conventional example of a hitless switching system is described in, for example, Japanese Laid Open Patent Application (JP-A-Heisei 9-83529). In this reference, hitless switching is realized by adjusting cell flows on 2-system transmission paths with redundant structure in phase. In an ATM cell flow control apparatus, a cell phase control is performed without influence of a policing function, even if the policing function is added to perform a discard control of any violation cell in the cell flow on each of 2-system transmission paths. In this method, a delay adjustment is performed to reception signals on 2-system transmission paths, which signals are shifted in phase due to the influence of the length difference between the duplicated transmission paths. Thus, the phases of the duplicated reception signals are matched to each other. In this way, the hitless switching is realized. A phase comparing circuit is provided at the front stage of the policing circuit, such that it is possible to avoid that a phase comparing operation is not correctly performed due to the influence of cell discarding by the policing circuit.

As a second conventional example, a hitless switching system is proposed in Japanese Laid Open Patent Application (JP-A-Heisei 8-186575), in which hitless switching is realized on the duplicated transmission paths. In the hitless switching system, like the technique which is described in the above Japanese Laid Open Patent Application (JP-A-Heisei 9-83529), the delay adjustment is performed to the reception signals of 2 systems in which phases are shifted. Thus, the duplicated reception signals are matched to each other in phase, so that the hitless switching is realized. Also, a phase comparison is performed based on the reception time of a monitoring cell which has been inserted by a transmission apparatus on the upper stream side on the transmission path.

As a third conventional example, an ATM switch is proposed in Japanese Laid Open Patent Application (JP-A-Heisei 8-139726), in which a buffer control of a hot standby system switch section is performed based on the number of cells remaining in two switch buffers. Thus, in the ATM switching system, the hitless switching is realized with a circuit of simple structure. FIGS. 1 and 2 show the structure of the first and second conventional examples of the hitless switching system.

As shown in FIG. 1, the conventional ATM switching system has a T cell inserting circuit 411, a branching circuit 412, a currently acting system switch 420, a standby system switch 430 and a selecting circuit 441. The currently acting system switch section 420 is composed of a buffer 421, a T cell detecting circuit 422 and a resident cell count detecting circuit 423. The standby system switch section 430 is composed of a buffer 431, a T cell detecting circuit 432, a resident cell count detecting circuit 433, a difference calculating circuit 434 and a read control circuit 435.

Also, the structure which is shown in FIG. 2 is composed of a threshold value comparing circuit 536 in the standby system switch 530 in addition to the structure of FIG. 1.

The ATM switching system which is proposed in the above Japanese Laid Open Patent Application (JP-A-Heisei 8-139726) shows a technique of realizing the hitless switching in the duplicated ATM switches in the apparatus. The number of cells stored in the currently acting system switch section and the number of cells stored in the standby system switch section are compared. When the number of cells stored in the currently acting system switch is larger, a cell reading operation from the standby system switch section is stopped for the difference between the number of cells stored in the currently acting system switch and the number of cells stored in the standby system switch. On the contrary, when the number of cells stored in the currently acting system switch is smaller, the reading operation address of the standby system switch section is proceeded for the difference. As a result, the number of cells stored in the standby system switch section is made to match to the number of cells stored in the currently acting system switch section. Thus, the hitless switching can be realized.

However, there is a problem in that both of the ATM cell flow control system mentioned in the above Japanese Laid Open Patent Application (JP-A-Heisei 9-83529) and the switching system mentioned in the above Japanese Laid Open Patent Application (JP-A-Heisei 8-186575) cannot be applied to the hitless switching of the ATM apparatus.

This is because both of the above conventional examples relate to the technique of realizing the hitless switching on the duplicated transmission paths. Therefore, the technique cannot be applied to the hitless switching in the switch sections of the ATM apparatus.

Also, the ATM switching system mentioned in the above Japanese Laid Open Patent Application (JP-A-Heisei 8-139726) might be applied to the hitless switching of the ATM switch. However, when the conventional ATM switching system is applied to the ATM switch having a discard priority control function, there is another problem in that the hitless switching cannot be performed.

This is because when the number of cells stored in one of the currently acting system switch section and the standby system switch section becomes larger than a threshold value of a low discard priority class while a process is performed to match the numbers of cells stored in both switch sections to each other, an input cell of the low discard priority class is discarded in one of the currently acting system switch section and the standby system switch section and stored in the other. Therefore, when the matching process is ended, the number of low discard priority class cells of the one switch section is different from that of the other switch section. In the structure shown in FIG. 2, the circuit for comparing threshold values is provided. However, the threshold value used in this circuit is not for the discard priority control. It is used for the determination of whether or not the cell storage states are matched.

In addition, a hitless switching system is described in Japanese Laid Open Patent Application (JP-A-Heisei 4-369140). In this reference, transmission path switching means of a transmission unit transmits an information sequence on a currently acting transmission path and a standby transmission path. Transmission path switching means of a reception unit is composed of delay inserting and removing means, delay control means and switching means. The delay inserting and removing means performs insertion or removal of a delay in units of cell lengths for a predetermined time period to the information sequence received from each transmission path. The delay control means controls the delay inserting and removing means such that the delay amounts of the information sequences are same. The switching means switches the output from the delay inserting and removing means of the currently acting system to the delay inserting and removing means of the standby system at the timing point when the delay amounts of the information sequences are same.

Also, an apparatus for matching byte phases of a transmission data in a currently acting system and standby system in an ATM communication system is described in Japanese Laid Open Patent Application (JP-A-Heisei 7-74756). In this reference, a cell head position of a readout data of a format conversion buffer 1A of the currently acting system A from an overhead is detected by a cell position byte counting circuit 3A and a cell position byte count corresponding to the detected byte count is notified to the standby system B. When the system is switched to the standby system B, a cell pulse generating circuit 5B of the standby system B determines a cell pulse generating timing of a cell pulse generating circuit 2B in accordance with the notified cell position byte count and controls a read operation from the buffer 1B. Thus, the hitless switching is made possible.

Also, a hitless switching apparatus is described in Japanese Laid Open Patent Application (JP-A-Heisei 8-23334). In this reference, an empty cell of an input signal is detected by an empty cell detecting sections 104 and 105. A portion of the input signal other than the detected empty cell is stored in memories 108 and 120. The signal of a currently acting system is sequentially read out and outputted via a selector 122. At this time, an empty cell is inserted on the same position as that of the detected empty cell by an empty cell detecting section 115. In this case, a cell is latched in either of the cell buffer 112 and the cell buffer 121 and is compared with a cell read out form the other by a comparing section to determine whether or not both of the cells are coincident with each other. When the coincidence is detected, the difference between the memories 108 and 120 in cell storage amount is determined so as to set an empty cell counter so that the empty cell is inserted by the empty cell inserting section 115. Thus, the hitless switching is realized.

Also, a hitless switching apparatus is described in Japanese Laid Open Patent Application (JP-A-Heisei 8-251184). In this reference, HEC error detecting sections 14-1 and 14-2 are connected to a currently acting system transmission path and a standby system transmission path, respectively, and outputs of them is connected to a selector 12. When a HEC error is detected by the HEC error detecting sections 14-1 of the currently acting system, a switching control section 13 generates a switching instruction such that the selector 12 selects the output of the HEC error detecting sections 14-2 of the standby system.

Also, a virtual path switching apparatus is described in Japanese Laid Open Patent Application (JP-A-Heisei 8-237253). In this reference, a sequence number and an identification code indicative of whether or not switching is necessary are given is allocated to a switching control OAM cell. The switching control OAM cell is intermittently transmitted on duplicate virtual paths (VPs: VP10T and VP11T) from a switching control OAM cell generating and inserting circuit 1-1. The delay difference between the virtual paths and the loss of the switching control OAM cell are detected by a VP reception node 2 such that switching between the VPs is performed in the state in which synchronization is established.

SUMMARY OF THE INVENTION

The present invention is accomplished in the viewpoint of the above problems. Therefore, an object of the present invention is to provide a hitless switching system of an ATM apparatus which has a discard priority control function.

In order to achieve an aspect of the present invention, a hitless switching system in an asynchronous transfer mode (ATM) apparatus, includes a first system switch section set as a currently acting system switch section and a second system switch section set as a hot standby system switch section. Each of the first and second system switch sections is switchable between the currently acting system switch section and the hot standby system switch section.

The first system switch section has a first cell buffer, and sequentially stores a sequence of cells in the first cell buffer to sequentially output the stored cells from the first cell buffer while performing a discard priority control to the sequence of cells. Also, the first system switch section stops the discard priority control when a switching control cell is detected in the sequence of cells. The second system switch section has a second cell buffer, and sequentially stores the input cells in the second cell buffer to sequentially output the stored cells from the second cell buffer while performing the discard priority control to the sequence of cells. When the switching control cell is detected in the input cell, the second system switch section stops the discard priority control and discards the stored cells from the second cell buffer together with the switching control cell.

The discard priority control may have a plurality of levels. Each of the plurality of levels is associated with a storage capacity of the first or second cell. The first cell buffer is equal to the second cell buffer in storage capacity. The switching control cell is inserted in the sequence of cells.

In the above, the first system switch section sequentially outputs stored cells from the first cell buffer, sets a first mode of the first system switch section when the switching control cell is detected as one of the sequence of cells, stores the sequence of cells in the first cell buffer in the first mode while stopping the discard priority control to the sequence of cells, and selectively stores a sequence of cells in the first cell buffer in a state in which the first mode is not set while performing the discard priority control to the sequence of cells. Also, the second system switch section does not output stored cells from the second cell buffer in a second mode and sequentially outputs the stored cells from the second cell buffer when the second mode is not set, sets the second mode when the switching control cell is detected in the sequence of cells to the second cell buffer, discards the stored cells from the second cell buffer together with the switching control cell when the second mode is set, stores the sequence of cells in the second cell buffer in the second mode while stopping the discard priority control to the sequence of cells, and selectively stores the sequence of cells in the second cell buffer in a state in which the second mode is not set while performing the discard priority control to the sequence of cells.

The hitless switching system may further include an input interface section which includes a switching control inserting section for generating the switching control cell in response to an insert instruction and inserting the switching control cell in a sequence of cells, and a branching circuit for supplying the sequence of cells to the first system switch section and the second system switch section.

In this case, the first system switch section may include the first cell buffer, a first detecting section for detecting the switching control cell in the sequence of cells to the first cell buffer to generate a first detection signal, and a second detecting section for detecting the switching control cell in the sequence of cells from the first cell buffer to generate a second detection signal, and a first control section. The first control section sets the first mode in response to the first detection signal, cancels the first mode in response to the second detection signal, stores the sequence of cells in the first cell buffer in the first mode while stopping the discard priority control, selectively stores the sequence of cells in the first cell buffer in a state in which the first mode is not set while performing the discard priority control to the sequence of cells, and sequentially outputs stored cells from the first cell buffer. Also, the second system switch section includes the second cell buffer, a third detecting section for detecting the switching control cell in the sequence of cells to the second cell buffer to generate a third detection signal, and a second control section. The second control section sets the second mode in response to the third detection signal, discards the stored cells from the second cell buffer together with the switching control cell when the second mode is set, stores the sequence of cells in the second cell buffer in the second mode while stopping the discard priority control, selectively stores the sequence of cells in the second cell buffer in a state in which the second mode is not set while performing the discard priority control to the sequence of cells, and sequentially outputs stored cells in the second cell buffer in the state in which the second mode is not set. In this case, the hitless switching system may further include an output interface section which includes a selecting circuit for selecting one of the cells outputted from the first system switch section and the cells outputted from the second system switch section in response to a selection control signal.

Instead, the first system switch section includes the first cell buffer, a first detecting section for detecting the switching control cell in the sequence of cells to the first cell buffer to generate a first detection signal, and a first control section. The first control section sets the first mode in response to the first detection signal, cancels the first mode in response to a second detection signal, stores the sequence of cells in the first cell buffer in the first mode while stopping the discard priority control, selectively stores the sequence of cells in the first cell buffer in a state in which the first mode is not set while performing the discard priority control to the sequence of cells, and sequentially outputs stored cells from the first cell buffer. The second system switch section includes the second cell buffer, a third detecting section for detecting the switching control cell in the sequence of cells to the second cell buffer to generate a third detection signal, and a second control section. The second control section sets the second mode in response to the third detection signal, cancels the second mode in response to the second detection signal, discards the stored cells in the second cell buffer together with the switching control cell when the second mode is set, stores the sequence of cells in the second cell buffer in the second mode while stopping the discard priority control, selectively stores the sequence of cells in the second cell buffer in a state in which the second mode is not set while performing the discard priority control to the sequence of cells, and sequentially outputs stored cells from the second cell buffer in a state in which the second mode is not set.

In this case, the hitless switching system may further include an output interface section which includes a selecting circuit for selecting one of the cells outputted from the first system switch section and the cells outputted from the second system switch section in response to a selection control signal, and a second detecting section for detecting the switching control cell in the sequence of cells from the first cell buffer to generate the second detection signal.

The hitless switching system may include an input interface section which includes a branching circuit for supplying the sequence of cells to the first system switch section and the second system switch section.

In this case, the first system switch section includes the first cell buffer, a switching control inserting section for generating the switching control cell in response to an insert instruction and inserting the switching control cell in the sequence of cells including the first and second cells, a first detecting section for detecting the switching control cell in the sequence of cells to the first cell buffer to generate the first detection signal, a second detecting section for detecting the switching control cell in the sequence of cells from the first cell buffer to generate the second detection signal, and a first control section. The first control section sets the first mode in response to the first detection signal, cancels the first mode in response to the second detection signal, stores the sequence of cells in the first cell buffer in the first mode while stopping the discard priority control, selectively stores the sequence of cells in the first cell buffer in a state in which the first mode is not set while performing the discard priority control to the sequence of cells, and sequentially outputs stored cells from the first cell buffer. Also, the second system switch section includes the second cell buffer, a switching control inserting section for generating the switching control cell in response to an insert instruction and inserting the switching control cell in the sequence of cells including the first and second cells, a third detecting section for detecting the switching control cell in the sequence of cells to the second cell buffer to generate the third detection signal, and a second control section. The second control section sets the second mode in response to the third detection signal, cancels the second mode in response to the second detection signal, discards the stored cells from the second cell buffer together with the switching control cell when the second mode is set, stores the sequence of cells in the second cell buffer in the second mode while stopping the discard priority control, selectively stores the sequence of cells in the second cell buffer in a state in which the second mode is not set while performing the discard priority control to the sequence of cells, sequentially outputs stored cells from the second cell buffer in the state in which the second mode is not set.

In this case, the hitless switching system may further include an output interface section which includes a selecting circuit for selecting one of the cells outputted from the first system switch section and the cells outputted from the second system switch section in response to a selection control signal.

Moreover, the hitless switching system may include a plurality of sets of the first system switch section and the second system switch section, a plurality of input interface sections, each of which supplies a sequence of cells, and a cell interleaving circuit for supplying each of the plurality of sequences of cells to a corresponding one of the plurality of sets of the first system switch section and the second system switch section.

In order to achieve another aspect of the present invention, a hitless switching method in an asynchronous transfer mode (ATM) apparatus, includes the steps of:

sequentially outputting stored cells in a first cell buffer of a first system switch section;

setting a first mode when a switching control cell is detected as an input cell to the first cell buffer;

storing a sequence of cells in the first cell buffer in the first mode while stopping a discard priority control;

selectively storing the sequence of cells in the first cell buffer in a state in which the first mode is not set while performing the discard priority control to the sequence of cells;

setting a second mode when the switching control cell is detected as an input cell to a second cell buffer;

sequentially outputting stored cells from the second cell buffer in a state in which the second mode is not set;

discarding the stored cells from the second cell buffer when the second mode is set;

storing the sequence of cells in the second cell buffer in the second mode while stopping the discard priority control to the sequence of cells;

selectively storing the sequence of cells from the second cell buffer in the state in which the second mode is not set while performing the discard priority control to the sequence of cells; and selecting one of the cells sequentially outputted from the first cell buffer and the cells sequentially outputted from the second cell buffer.

BRIEF DESCRIPTION OF THE DRAWINGS

FIGS. 6A to 6C are diagrams illustrating the operation of the discard priority control in a normal mode in the hitless switching system according to the first embodiment of the present invention;

FIGS. 7A to 7G are diagrams illustrating the cell storage states of the cell buffer in the hitless switching system according to the first embodiment of the present invention;

FIGS. 8A to 8G are diagrams illustrating the cell storage states of the cell buffer in the hitless switching system when the discard priority control is not performed.

DESCRIPTION OF THE PREFERRED EMBODIMENTS

Next, a hitless switching system of an ATM apparatus of the present invention will be described with reference to the attached drawings.

Figure 1:
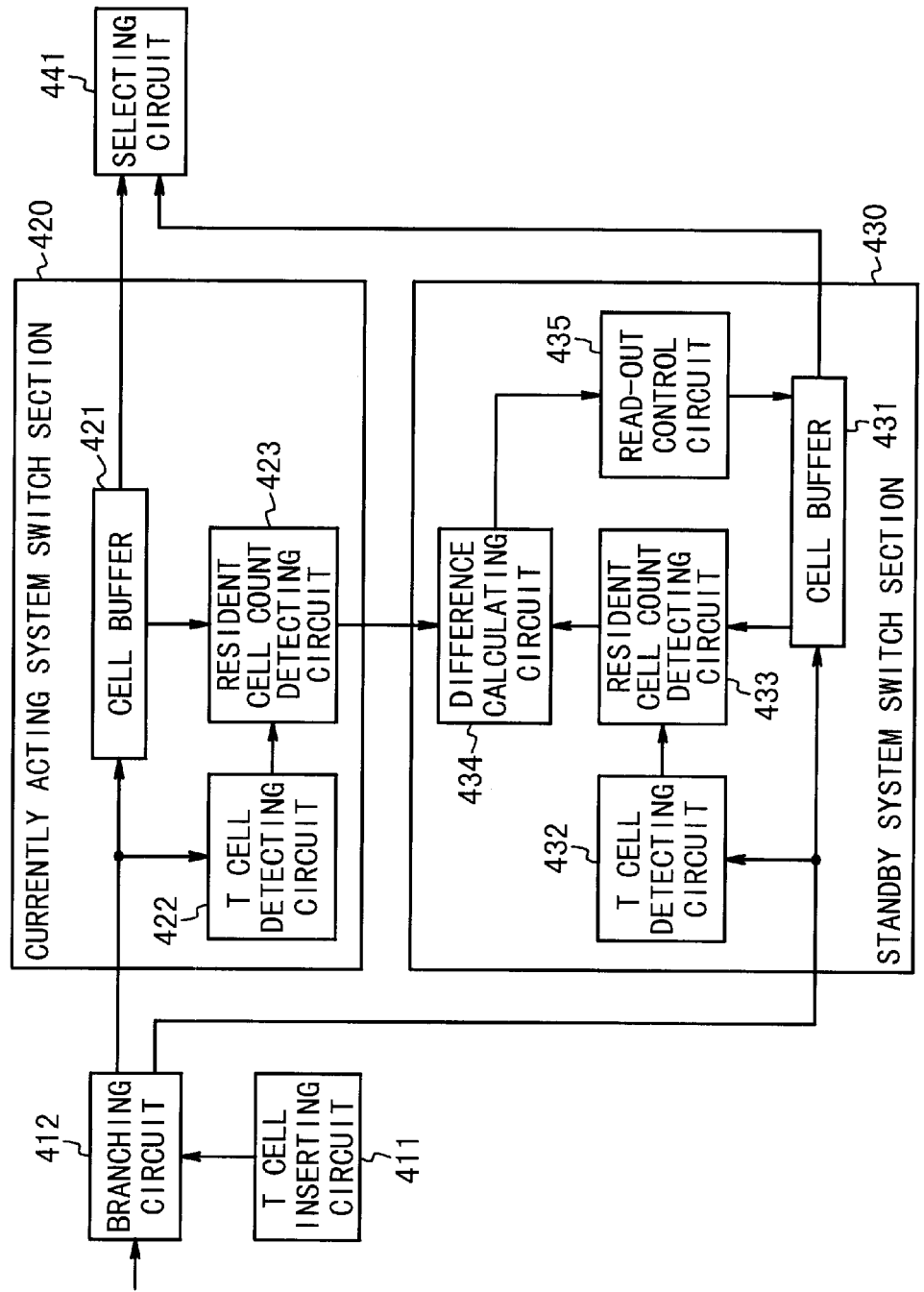
FIG. 1 is a block diagram illustrating the structure of a first conventional example of a hitless switching system.
Figure 2:
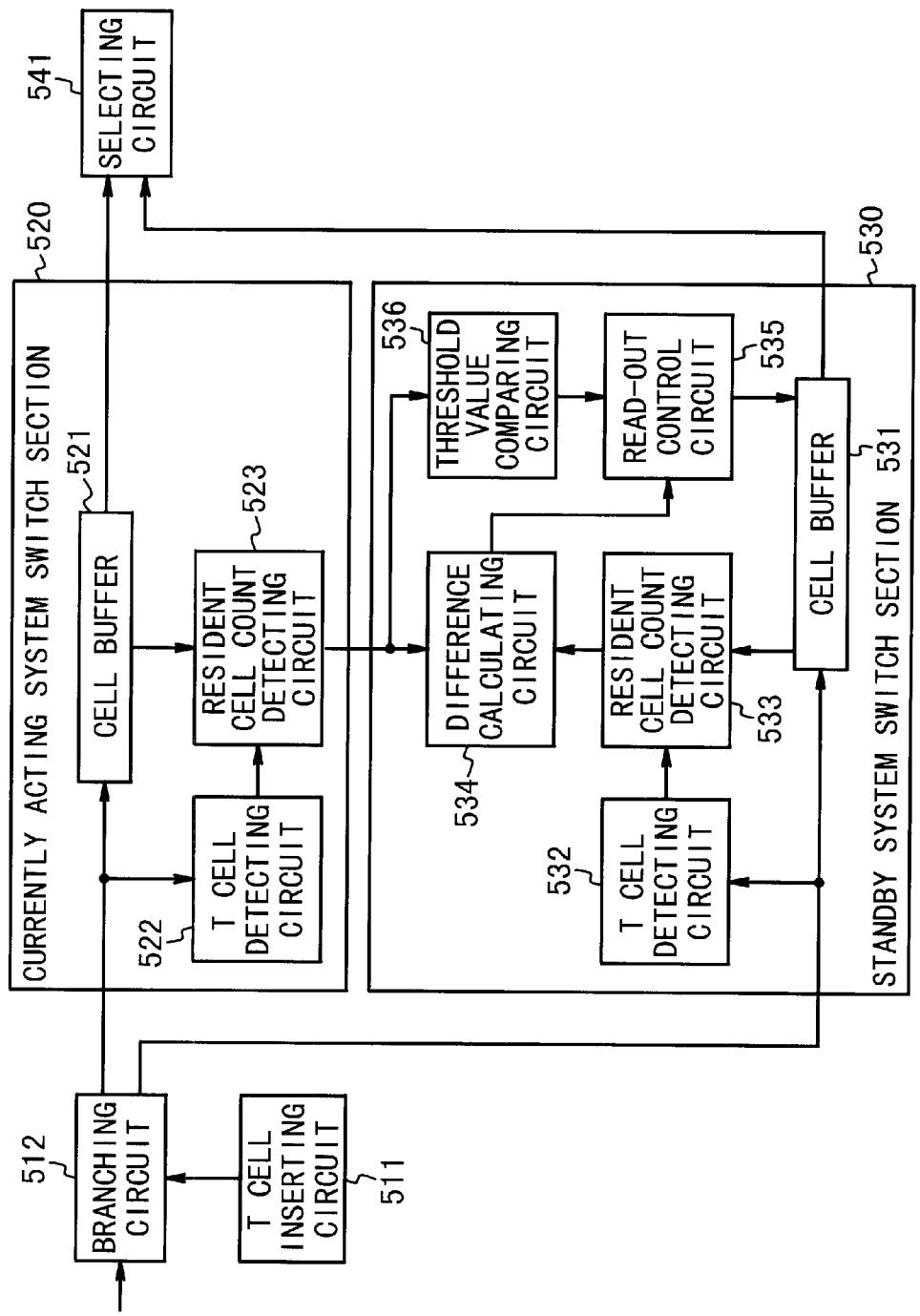
FIG. 2 is a block diagram illustrating the structure of a second conventional example of a hitless switching system.
Figure 3:
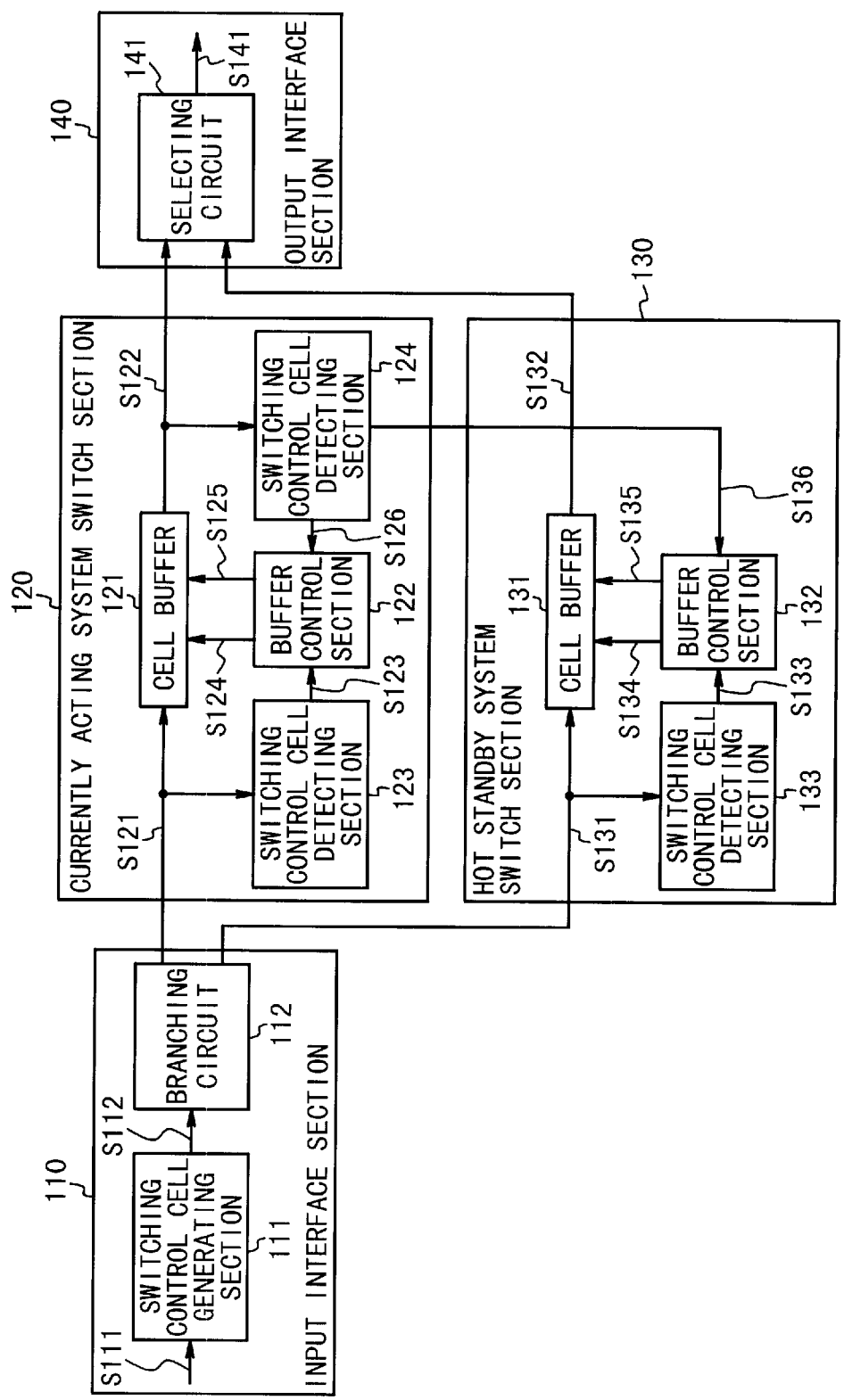
FIG. 3 is a block diagram illustrating the structure of a hitless switching system of an ATM switch apparatus according to a first embodiment of the present invention.

FIG. 3 is a block diagram illustrating the structure of the hitless switching system according to the first embodiment of the present invention. The case that each of an input interface section and an output interface section is single will be described below, using an example, to facilitate understanding. However, the present invention is not limited to such a structure, of course.

Referring to FIG. 3, the hitless switching system in the first embodiment is composed of an input interface section 110, a currently acting system switch section 120, a hot standby system switch section 130, and an output interface section 140. The currently acting system switch section 120 and the hot standby system switch section 130 have the same structure. When an output of the hot standby system switch section 130 is selected, the hot standby system switch section 130 is set to the currently acting system switch section. Also, the switch section 120 is set to the hot standby system switch section. A part of the switch section is active in a current acting system but is inactive in a hot standby system.

The input interface section 110 is composed of a switching control cell generating section 111 and a branching circuit 112. The switching control cell generating section 111 generates and inserts a switching control cell in an input signal S111 as a cell sequence in response to an insert instruction issued from an apparatus monitoring section (not shown). The switching control cell is used as a timing signal for the operation of matching the numbers of cells to each other in the switch sections. The branching circuit 112 equally supplies the signal S112 which contains the switching control cell, to the currently acting system switch section 120 and the hot standby system switch section 130.

The currently acting system switch section 120 is composed of a cell buffer 121, a buffer control section 122, a first switching control cell detecting section 123 and a second switching control cell detecting section 124. The second switching control cell detecting section 124 is active in the currently acting system but inactive in the hot standby system. The cell buffer 121 stores cells inputted from input interface section 110. The buffer control section 122 performs a discard priority control to the input cells, which is contained in the input signal S121, in a normal mode. When receiving a first detection notice signal S123 from the first switching control cell detecting section 123, the buffer control section 122 sets a control stop mode and stops the discard priority control. When receiving a second detection notice signal S126 from the second switching control cell detecting section 124, the buffer control section 122 resets the normal mode to restart the discard priority control. The first switching control cell detecting section 123 detects the switching control cell in a cell sequence of the input signal S121 to generate the first detection notice signal to the buffer control section 122. The second switching control cell detecting section 124 detects the switching control cell in a cell sequence read out from the cell buffer 121 to generate the second detection notice signal. The second switching control cell detecting section 124 outputs the second detection notice signal to the buffer control section 122 and a buffer control section 132 to be described later in the hot standby system switch section 130.

It should be noted that the hitless switching system generally has the cell buffer 121 and the buffer control section 122 for every input interface section 110 and for every output interface section 140. However, in the example shown in FIG. 3, a set of the cell buffers 121 and the buffer control section 122 are provided in correspondence to one input interface section 110 and one output interface section 140.

The hot standby system switch section 130 is composed of a cell buffer 131, a buffer control section 132, and a first switching control cell detecting section 133. The cell buffer 121 stores cells inputted from input interface section 110. The buffer control section 122 performs a discard priority control to the input cells, which is contained in a cell sequence of the input signal S131, in a normal mode. When receiving a first detection notice signal S133 from the first switching control cell detecting section 133, the buffer control section 132 sets a control stop mode and stops the discard priority control. Also, the buffer control section 132 reads out and discards cells stored in the cell buffer 131. In addition, the buffer control section 132 stops the reading operation from the cell buffer 131. When receiving a second detection notice signal S136 from the second switching control cell detecting section 124 in the currently acting system switch section 120, the buffer control section 122 resets the normal mode to restart the discard priority control. The first switching control cell detecting section 133 detects the switching control cell in the cell sequence of the input signal S131 to generate the first detection notice signal to the buffer control section 132.

It should be noted that the hitless switching system generally has the cell buffer 121 and the buffer control section 122 for every input interface section 110 and for every output interface section 140. However, in the example shown in FIG. 3, a set of the cell buffers 121 and the buffer control section 122 are provided in correspondence to one input interface section 110 and one output interface section 140.

The output interface section 140 includes a selecting circuit 141 selects one of an input signal S122 from the currently acting system switch section 120 and an input signal S132 from hot standby system switch section 130 in accordance with a selection signal from the apparatus monitoring section (not shown) and outputs the selected signal as an output signal S141.

Next, an operation of the hitless switching system according to the first embodiment of the present invention will be described with reference to FIG. 3. In the following description, it is supposed that two discard priority classes are present, to facilitate understanding. However, the number of discard priority classes is not limited to two and it may be more than two.

The switching control cell generating section 111 inserts a switching control cell in the main signal S111, which is inputted to the input interface section 110, in response to the insert instruction generated from the apparatus monitoring section. The position where the switching control cell is inserted depends on the apparatus structure, and the system configuration.

The main signal S112 which contains the switching control cell is equally supplied to the currently acting system switch section 120 and the hot standby system switch section 130 as the signal S121 and the signal S131 by the branching circuit 112.

When detecting the switching control cell in the cell sequence of the input signal S121, the first switching control cell detecting section 123 of the currently acting system switch section 120 generates the first detection notice signal S123 to the buffer control section 122. When detecting the switching control cell in the cell sequence of the output signal S122, the second switching control cell detecting section 124 generates the second detection notice signal S126 to the buffer control section 122. Also, the second switching control cell detecting section 124 outputs the second detection notice signal S136 to the buffer control section 132 of the hot standby system switch section 130.

The buffer control section 122 of the currently acting system switch section 120 counts the number of cells stored in the cell buffer 121. In the discard priority control, a discard threshold value (th__L) for a low discarding priority class and a discard threshold value (th__H) of a high discard priority class are previously set. Generally, the discard threshold value (th__H) of the high discard priority class is equal to the cell buffer length and a relation of (0<th__L<th__H) is satisfied. The buffer control section 122 performs the discard priority control in the normal mode in which the cell count matching process is not performed. However, when receiving the first detection notice signal S123 from the first switching control cell detecting section 123, the buffer control section 122 stops the discard priority control. Also, when receiving the second detection notice signal S126 from the second switching control cell detecting section 124, the buffer control section 122 restarts the discard priority control.

More specifically, when the discard priority control is performed, the buffer control section 122 writes an input cell in the cell buffer 121, regardless of the discard priority class of the input cell, in case that the number of cells stored in the cell buffer 121 is smaller than the discard priority threshold value (th__L). Also, the buffer control section 122 writes an input cell in the cell buffer 121, when the input cell is of the high discard priority class, in case that the number of cells stored in the cell buffer 121 is equal to or larger than the discard priority threshold value (th__L) and smaller than the discard priority threshold value (th__H). Also, the buffer control section 122 does not write an input cell in the cell buffer 121 but discards it, when the input cell is of the low discard priority class.

Further, the buffer control section 122 writes an input cell in the cell buffer 121 during the cell count matching process, i.e., while the discard priority control, regardless of the discard priority class of the input cell if there is an empty area in the cell buffer 121. If there is not an empty area in the cell buffer 121, the buffer control section 122 discards the input cell.

When detecting the switching control cell in the cell sequence of the input signal S131, the first switching control cell detecting section 133 of the hot standby system switch section 130 generates the second detection notice signal S133 to the buffer control section 132.

The buffer control section 132 of the hot standby system switch section 130 counts the number of cells stored in the cell buffer 131. In the discard priority control, a discard threshold value (th__L) for a low discarding priority class and a discard threshold value (th__H) of a high discard priority class are previously set. Generally, the discard threshold value (th__H) of the high discard priority class is equal to the cell buffer length and a relation of (0<th__L<th__H) is satisfied. Also, the discard threshold values are equal to each other between the currently acting system switch section 120 and the hot standby system switch section 130.

The buffer control section 132 performs the discard priority control in the normal mode in which the cell count matching process is not performed. However, when receiving the first detection notice signal S133 from the first switching control cell detecting section 133, the buffer control section 122 sets the control stop mode and stops the discard priority control. At the same time, the buffer control section 132 reads out and discards the cells stored in the cell buffer 131. Also, when receiving the second detection notice signal S136 from the second switching control cell detecting section 124, the buffer control section 122 restarts the discard priority control.

More specifically, when the discard priority control is performed, the buffer control section 132 writes an input cell in the cell buffer 121, regardless of the discard priority class of the input cell, in case that the number of cells stored in the cell buffer 131 is smaller than the discard priority threshold value (th_L). Also, the buffer control section 132 writes an input cell in the cell buffer 131, when the input cell is of the high discard priority class, in case that the number of cells stored in the cell buffer 131 is equal to or larger than the discard priority threshold value (th_L) and smaller than the discard priority threshold value (th_H). Also, the buffer control section 132 does not write an input cell in the cell buffer 131 but discards it, when the input cell is of the low discard priority class.

The selecting circuit 141 in the output interface section 140 selects either one of the input signal S122 from the currently acting system switch section 120 and the input signal S132 from the hot standby system switch section 130 in response to the selection control signal and outputs the selected signal as the output signal S141. It should be noted that the switch section from which the signal is selected is called the "currently acting system" and the input signal S122 from the currently acting system switch section 120 is selected.

Next, the cell count matching process described above will be described with reference to the cell storage states of the cell buffer 121 of the currently acting system switch sections 120 to and the cell buffer 131 of the hot standby system switch sections 130.

FIGS. 6A to 6C are diagrams to explain the discard priority control in the normal mode. In this example, it is supposed that the number of discard priority classes is two. In the figures, alphabet capital (A) indicates a cell of the high discard priority class and the minuscule (b) of the alphabet indicates a cell of the low discard priority class. Also, a hatched cell indicates a cell which is already stored in each cell buffer. Because the discard priority class of each stored cell is unnecessary for the following explanation, it is omitted.

Referring to FIG. 6A, the stored cell count of the currently acting system cell buffer 121 is more than the low discard priority threshold value (th_L) and the stored cell count of the hot standby system cell buffer 131 is smaller than the low discard priority threshold value (th_L).

In this state, when a cell A of the high discard priority class is inputted, the cell A is written in the currently acting system cell buffer 121 and the hot standby system cell buffer 131, because the number of the stored cell count is smaller than the high discard priority threshold value (th_H) in the both of the cell buffers 121 and 131. Thus, the cell storage state changes to the state shown in FIG. 6B. FIG. 6B shows the state after the cell A is written in the cell buffers 121 and 131.

In this state, when a cell b of the low discard priority class is inputted, the cell b is discarded in the current use system switch section 120 because the stored cell count of the cell buffer 121 is more than the low discard priority threshold value (th_L). On the other hand, the cell b is written in the hot standby system cell buffer 131, because the stored cell count of the cell buffer 131 is smaller than the low discard priority threshold value (th_L). Thus, the hot standby system cell buffer 131 changes to the state shown in FIG. 6C.

Next, an operation of the hitless switching system according to the first embodiment of the present invention in the control stop mode will be described with reference to FIGS. 7A to 7G. In this example, it is supposed that the number of discard priority classes is two. In the figures, alphabet capital (A) indicates a cell of the high discard priority class and the minuscule (b) of the alphabet indicates a cell of the low discard priority class. Also, a hatched cell indicates a cell which is already stored in each cell buffer. Because the discard priority class of each stored cell is unnecessary for the following explanation, it is omitted. Symbols X and Y indicates switching control cells which are the same cell originally. However, different symbols are allocated to the switching control cell to distinguish the cell inputted to the currently acting system cell buffer 121 from the cell inputted to the hot standby system cell buffer 131.

As shown in FIG. 7A, the stored cell count of the currently acting system cell buffer 121 is more than the low discard priority threshold value (th_L) and the stored cell count of the hot standby system cell buffer 131 is smaller than the low discard priority threshold value (th_L).

In this state, when a switching control cell X or Y is inputted, the cell count matching process is started. In the currently acting system cell buffer 121, the switching control cell X is detected so that the control stop mode is set. Also, in the control stop mode, the discard priority control is stopped and the switching control cell X is written in the currently acting system cell buffer 121. Also, in hot standby system cell buffer 131, the switching control cell Y is detected so that the control stop mode is set. The cells stored in the hot standby system cell buffer 131 are read out and discarded together with the switching control cell Y in the control stop mode. Also, the discard priority control is stopped. As a result, the cell storing states of the currently acting system cell buffer 121 and hot standby system cell buffer 131 change to the states shown in FIG. 7B. FIG. 7B shows the states immediately after the cell count matching process is started to adjust phases.

When a cell A of the high discard priority class is inputted, the Cell A is written in each of the cell buffers 121 and 131. As a result, the cell storing states of the currently acting system cell buffer 121 and hot standby system cell buffer 131 change the states shown in FIG. 7C. FIG. 7C shows the states after the cell A is written.

When a cell b of the low discard priority class is inputted, the cell b is written in each of the cell buffers 121 and 131, because there is an empty area in which each of the cell buffers 121 and 131. As a result, the cell storing states of the currently acting system cell buffer 121 and hot standby system cell buffer 131 change the states shown in FIG. 7D.

In this state, because the discard priority control stops, the cell b is written in the currently acting system cell buffer 121 that the stored cell count is more than the low discard priority threshold value (th_L). Also, because the reading operation is stopped in the hot standby system cell buffer 131, the cell A is not outputted.

The cell count matching process is continued in the same way, and after 8 cell times, the switching control cell X is read out from currently acting system cell buffer 121. At this time, the cell storing states of the currently acting system cell buffer 121 and hot standby system cell buffer 131 change the states shown in FIG. 7E.

Referring to FIG. 7E, it could be found that the number of cells stored in the currently acting system cell buffer 121 is equal to that of the hot standby system cell buffer 131. Because the switching control cell X is read out from the currently acting system cell buffer 121, it is detected so that the normal mode is set again. Thus, the discard priority control and the reading operation are restarted.

When a cell k of the low discard priority class is inputted in the state shown in FIG. 7E, the cell k is not written and discarded in both of the cell buffers 121 and 131, because the stored cell counts of the cell buffers 121 and 131 are both more than the low discard priority threshold value (th_L).

As a result, the cell storing states of the currently acting system cell buffer 121 and hot standby system cell buffer 131 change the states shown in FIG. 7F.

Next, when a cell L of the high discard priority class is inputted, the cell L is written in both of the cell buffers 121 and 131, because the stored cell counts of the cell buffers 121 and 131 are smaller than high discard priority threshold value (th_H). As a result, the cell storing states of the currently acting system cell buffer 121 and hot standby system cell buffer 131 change the states shown in FIG. 7G.

Thereafter, because the cell discarding process is performed equally in the cell buffers 121 and 131, the cell storage states of the cell buffers 121 and 131 are always kept to be equal.

In this state, even if the signal selected by the selecting circuit 141 in the output interface section 140 is switched from the input signal S122 supplied from the currently acting system switch section 120 to the input signal S132 supplied from the hot standby system switch section 130, a cell sequence continuity is kept before and after this switching. Thus, the hitless switching can be realized.

FIGS. 8A to 8G are diagrams to explain the operation when the discard priority control is not stopped in the cell count matching process. FIGS. 8A to 8G show a comparison example in the first embodiment of the present invention. In FIGS. 8A to 8G, the cell sequence and the cell storage states of the cell buffers 121 and 131 are the same as those shown in FIGS. 7A to 7G, in order to confirm the effect of the present invention.

As shown in FIG. 8A, the stored cell count of the currently acting system cell buffer 121 is more than the low discard priority threshold value (th_L) and the stored cell count of the hot standby system cell buffer 131 is smaller than the low discard priority threshold value (th_L).

In this state, when the switching control cell X or Y is inputted. The switching control cell X is written in the currently acting system cell buffer 121. Also, in hot standby system cell buffer 131, the cells stored in the hot standby system cell buffer 131 are read out and discarded together with the switching control cell Y. As a result, the cell storing states of the currently acting system cell buffer 121 and hot standby system cell buffer 131 change to the states shown in FIG. 8B. FIG. 8B shows the states immediately after the cell count matching process is started to adjust phases.

Figures 8C-1, 8C-2, 8D-1, 8D-2:
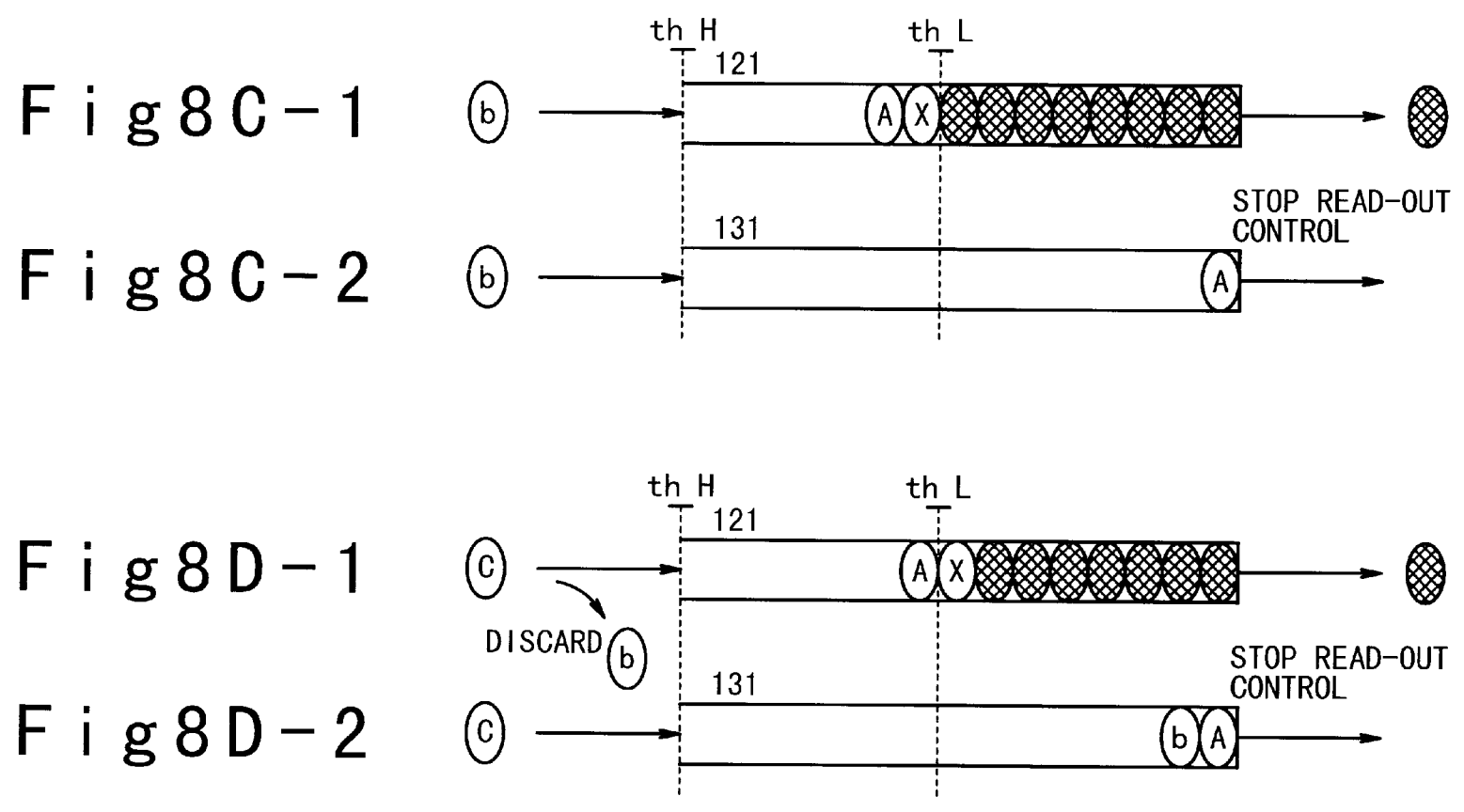

When a cell A of the high discard priority class is inputted, the cell A is written in each of the cell buffers 121 and 131. As a result, the cell storing states of the currently acting system cell buffer 121 and hot standby system cell buffer 131 change the states shown in FIG. 8C. FIG. 8C shows the states after the cell A is written.

Next, when a cell b of the low discard priority class is inputted, the cell b is not written in the cell buffer 121 and is discarded, because the stored cell count is more than the low discard priority threshold value (th_L) in the currently acting system cell buffer 121. On the other hand, the cell b is written in the cell buffer 131, because the stored cell count is smaller than the low discard priority threshold value (th_L) in the hot standby system cell buffer 131. As a result, the cell storing states of the currently acting system cell buffer 121 and hot standby system cell buffer 131 change the states shown in FIG. 8D.

Thus, in the conventional example, the discard priority control is not stopped during the cell count matching process. Therefore, the discard priority control is performed as shown in FIGS. 6A to 6C. Also, because the reading operation is stopped in the hot standby system cell buffer 131, the cell A is not outputted.

The cell count matching process is continued in the same way, and after 8 cell times, the switching control cell X is read out from currently acting system cell buffer 121. At this time, the cell storing states of the currently acting system cell buffer 121 and hot standby system cell buffer 131 change the states shown in FIG. 8E.

Referring to FIG. 8E, it could be found that the number of cells stored in the currently acting system cell buffer 121 is smaller by the number of discarded cells than the number of cells stored in the hot standby system cell buffer 131. Because the switching control cell X is read out from the currently acting system cell buffer 121, the reading operation is restarted in the hot standby system cell buffer 131.

When a cell k of the low discard priority class is inputted in the state shown in FIG. 8E, the cell k is written in the cell buffer 121, because the stored cell count of the cell buffer 121 is smaller than the low discard priority threshold value (th_L). On the other hand, the cell k is not written and discarded in the cell buffer 131, because the stored cell count of the cell buffer 131 is more than the low discard priority threshold value (th_L). As a result, the cell storing states of the currently acting system cell buffer 121 and hot standby system cell buffer 131 change the states shown in FIG. 8F.

Next, when a cell L of the high discard priority class is inputted, the cell L is written in both of the cell buffers 121 and 131, because the stored cell counts of the cell buffers 121 and 131 are smaller than high discard priority threshold value (th_H). As a result, the cell storing states of the currently acting system cell buffer 121 and hot standby system cell buffer 131 change the states shown in FIG. 8G.

Thereafter, the cell discarding process is performed equally to the cell buffers 121 and 131. For the reason described above, the output cells in the state shown in FIG. 8G are different from each other in the currently acting system cell buffer 121 and the hot standby system cell buffer 131.

In this state, when the signal selected by the selecting circuit 141 in the output interface section 140 is switched from the input signal S122 supplied from the currently acting system switch section 120 to the input signal S132 supplied from the hot standby system switch section 130, a cell F is outputted from the hot standby system cell buffer 131 after the cell F is outputted from the currently acting system cell buffer 121. Thus, the same cell is double outputted. As a result, a cell sequence continuity cannot be kept before and after this switching. Thus, the hitless switching cannot be realized.

Figure 4:
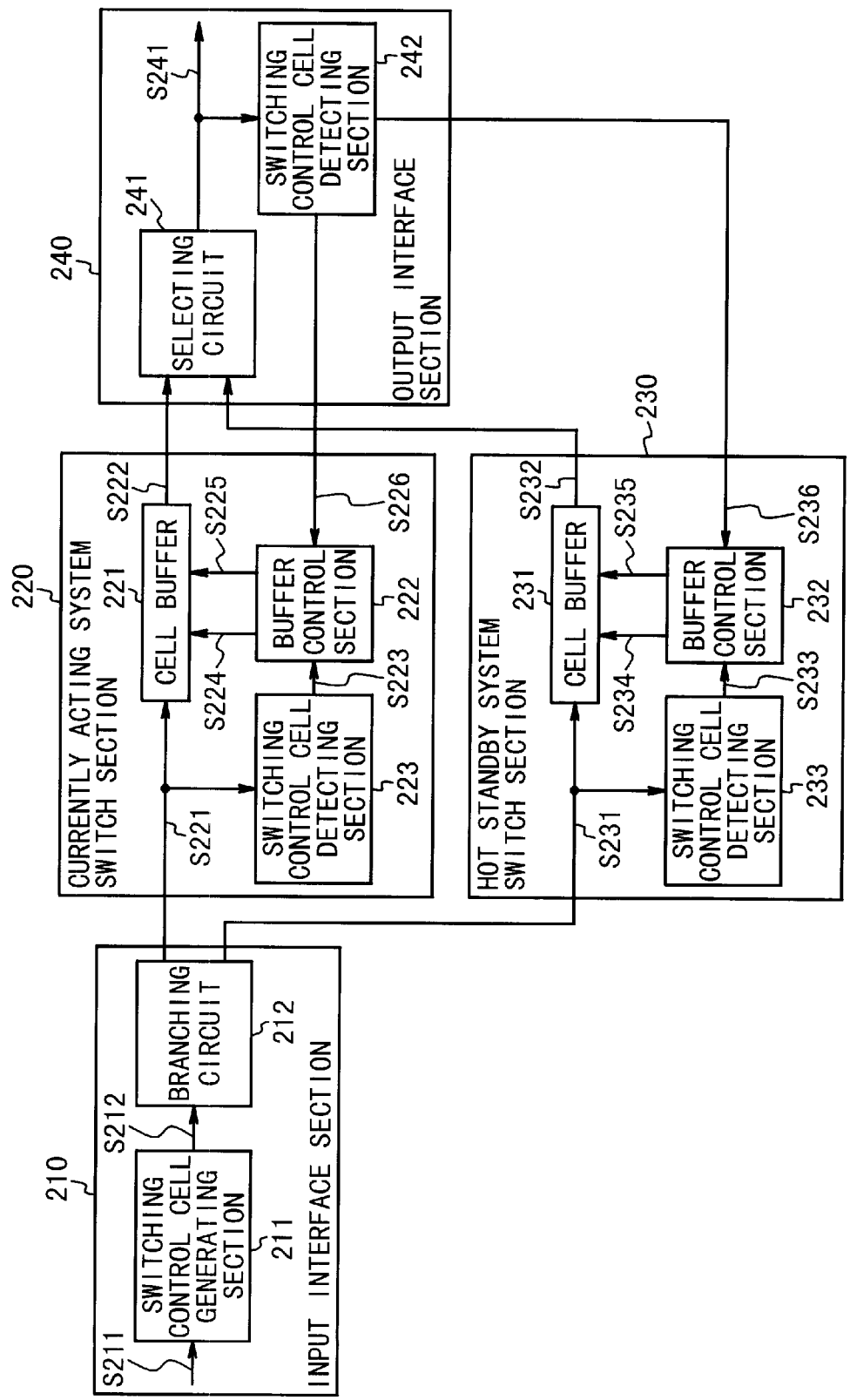
FIG. 4 is a block diagram illustrating the structure of the hitless switching system of an ATM switch apparatus according to a second embodiment of the present invention.

Next, the hitless switching system according to the second embodiment of the present invention will be described with reference to FIG. 4. FIG. 4 is a block diagram illustrating the structure of the hitless switching system according to the second embodiment of the present invention. The case that each of an input interface section and an output interface section is single will be described below, using an example, to facilitate understanding. However, the present invention is not limited to such a structure, of course.

Referring to FIG. 4, the hitless switching system in the second embodiment is composed of an input interface section 210, a currently acting system switch section 220, a hot standby system switch section 130, and an output interface section 240. The input interface section 210 is composed of the a switching control cell generating section 211 and a branching circuit 212. The operations of switching control cell generating section 211 and branching circuit 212 are the same as those of the switching control cell generating section 111 and branching circuit 112.

The currently acting system switch section 220 is composed of a cell buffer 221, a buffer control section 222, and a first switching control cell detecting section 223. The cell buffer 221 stores cells inputted from input interface section 210. The buffer control section 222 performs a discard priority control to the input cells, which is contained in the input signal S221, in a normal mode. When receiving a first detection notice signal S223 from the first switching control cell detecting section 223, the buffer control section 122 sets a control stop mode and stops the discard priority control. When receiving a second detection notice signal S226, the buffer control section 122 resets the normal mode to restart the discard priority control. The first switching control cell detecting section 223 detects the switching control cell in a cell sequence of the input signal S221 to generate the first detection notice signal to the buffer control section 222.

The operations of the cell buffer 221, buffer control section 222, and first switching control cell detecting section 223 are same as those of the cell buffer 121, buffer control section 122, and first switching control cell detecting section 123 in the first embodiment.

It should be noted that the hitless switching system generally has the cell buffer 221 and the buffer control section 222 for every input interface section 210 and for every output interface section 240. However, in the example shown in FIG. 4, a set of the cell buffers 221 and the buffer control section 222 are provided in correspondence to one input interface section 210 and one output interface section 240.

The hot standby system switch section 230 is composed of a cell buffer 231, a buffer control section 232, and a first switching control cell detecting section 233. The cell buffer 221 stores cells inputted from input interface section 210. The buffer control section 222 performs the discard priority control to the input cells, which is contained in a cell sequence of the input signal S231, in a normal mode. When receiving a first detection notice signal S233 from the first switching control cell detecting section 233, the buffer control section 232 sets a control stop mode and stops the discard priority control. Also, the buffer control section 232 reads out and discards cells stored in the cell buffer 131 together with the switching control cell. In addition, the buffer control section 232 stops the reading operation from the cell buffer 231. When receiving a second detection notice signal S136, the buffer control section 222 resets the normal mode to restart the discard priority control. The first switching control cell detecting section 233 detects the switching control cell in the cell sequence of the input signal S231 to generate the first detection notice signal S233 to the buffer control section 232. The operations of the cell buffer 2 or 31, buffer control section 232, and first switching control cell detecting section 233 are the same as those of the cell buffer 131, buffer control section 132, and first switching control cell detecting section 133 in the first embodiment.

It should be noted that the hitless switching system generally has the cell buffer 221 and the buffer control section 222 for every input interface section 210 and for every output interface section 240. However, in the example shown in FIG. 4, a set of the cell buffers 221 and the buffer control section 222 are provided in correspondence to one input interface section 210 and one output interface section 240.

The output interface section 140 is composed of a selecting circuit 241 and a second switching control cell detecting section 242. The selecting circuit 241 selects one of an input signal S222 from the currently acting system switch section 220 and an input signal S232 from hot standby system switch section 230 in accordance with a selection signal from the apparatus monitoring section (not shown) and outputs the selected signal as an output signal S241. The second switching control cell detecting section 242 detects the switching control cell in a cell sequence outputted from the selecting circuit 241 to generate the second detection notice signal. The second switching control cell detecting section 242 outputs the second detection notice signal S226 to the buffer control section 222 in the currently acting system switch section 220 and the second detection notice signal S236 to the buffer control section 232 in the hot standby system switch section 230.

In the hitless switching system in the second embodiment of the present invention, a position where the second switching control cell detecting section 242 is provided is different from that in the first embodiment. The operation of the hitless switching system in the second embodiment is the same as that of the first embodiment. Therefore, the description will be omitted.

Figure 5:
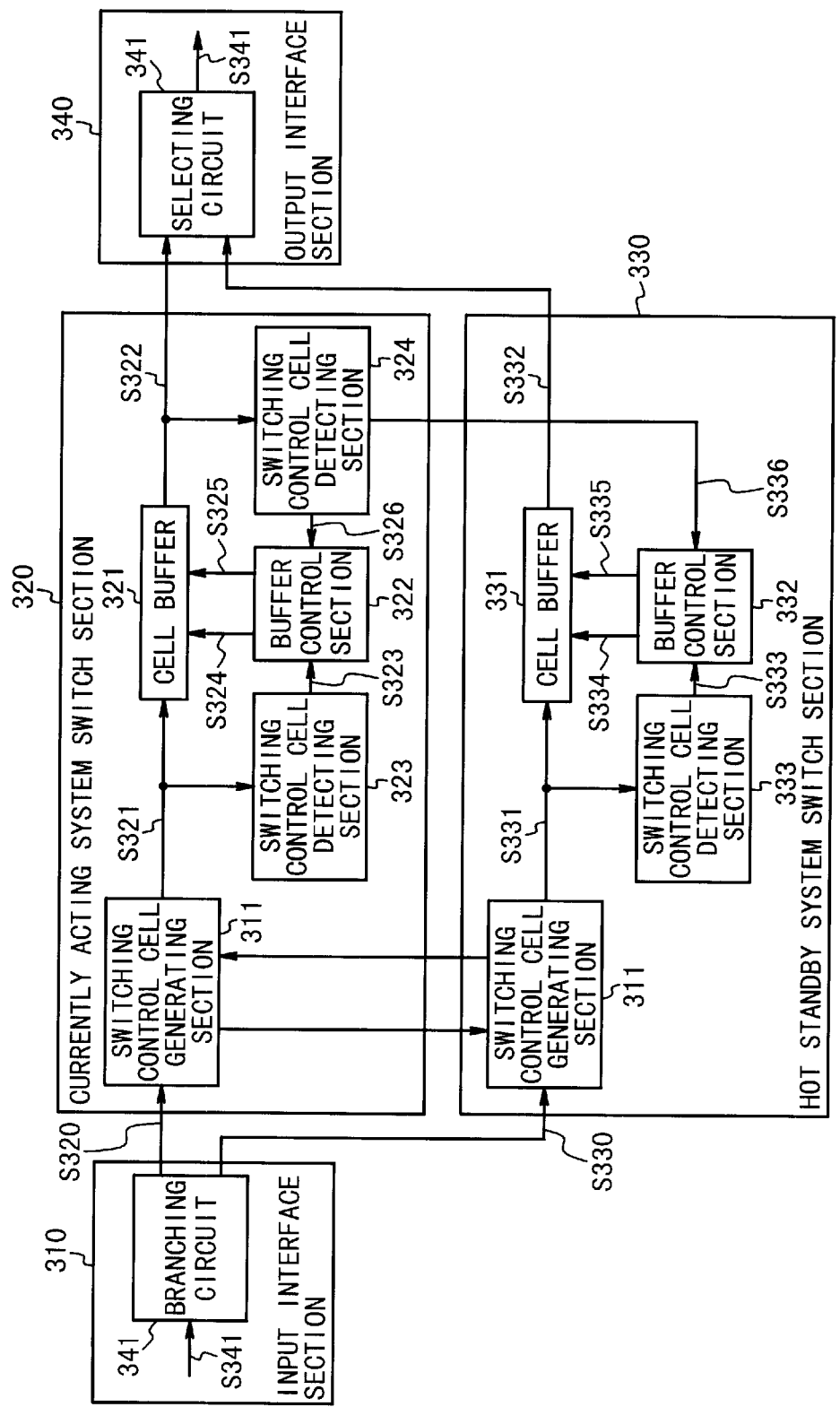
FIG. 5 is a block diagram illustrating the structure of the hitless switching system of an ATM switch apparatus according to a third embodiment of the present invention.

FIG. 5 is a block diagram illustrating the structure of the hitless switching system according to the third embodiment of the present invention. The case that each of an input interface section and an output interface section is single will be described below, using an example, to facilitate understanding. However, the present invention is not limited to such a structure, of course.

Referring to FIG. 5, the hitless switching system in the first embodiment is composed of the input interface section 310, a currently acting system switch section 320, a hot standby system switch section 330, and an output interface section 340. The output interface section 310 is composed of a branching circuit 311. The branching circuit 311 equally supplies the signal S311, which contains the switching control cell, to the currently acting system switch section 320 and the hot standby system switch section 330. The operation of the branching such circuit 311 is the same as that of the branching circuit 112 in the first embodiment.

The currently acting system switch section 320 is composed of a switching control cell generating section 335, a cell buffer 321, a buffer control section 322, a first switching control cell detecting section 323 and a second switching control cell detecting section 324. The switching control cell generating section 325 generates and inserts a switching control cell in a cell sequence of an input signal S320 in response to an insert instruction issued from an apparatus monitoring section (not shown). The cell buffer 321 stores cells of a signal S321 inputted from the first switching control cell generating section 325. The buffer control section 322 performs the discard priority control to the input cells, which is contained in the input signal S321, in a normal mode. When receiving a first detection notice signal S323 from the first switching control cell detecting section 323, the buffer control section 322 sets a control stop mode and stops the discard priority control. When receiving a second detection notice signal S326 from the second switching control cell detecting section 324, the buffer control section 322 resets the normal mode to restart the discard priority control. The first switching control cell detecting section 323 detects the switching control cell in a cell sequence of the input signal S321 to generate the first detection notice signal S323 to the buffer control section 322. The second switching control cell detecting section 324 detects the switching control cell in a cell sequence read out from the cell buffer 321 to generate the second detection notice signals S326 and S336. The second switching control cell detecting section 324 outputs the second detection notice signal S326 to the buffer control section 322 and the second detection notice signal S336 to a buffer control section 332 to be described later in the hot standby system switch section 330.

The operations of the switching control cell generating section 335, cell buffer 321, a buffer control section 322, first switching control cell detecting section 323 and second switching control cell detecting section 324 are the same as those of the switching control cell generating section 111, cell buffer 121, buffer control section 122, first switching control cell detecting section 123 and second switching control cell detecting section 124 in the first embodiment.

It should be noted that the hitless switching system generally has the cell buffer 321 and the buffer control section 322 for every input interface section 310 and for every output interface section 340. However, in the example shown in FIG. 5, a set of the cell buffers 321 and the buffer control section 322 are provided in correspondence to one input interface section 310 and one output interface section 340.

The hot standby system switch section 330 is composed of a switching control cell generating section 334, a cell buffer 331, a buffer control section 332, and a first switching control cell detecting section 333. The switching control cell generating section 334 generates and inserts the switching control cell in an input signal S331 as a cell sequence in response to an insert instruction issued from an apparatus monitoring section (not shown). The cell buffer 321 stores cells of a signal S331 inputted from the switching control cell generating section 334. The buffer control section 322 performs the discard priority control to the input cells, which is contained in a cell sequence of the input signal S331, in a normal mode. When receiving a first detection notice signal S333 from the first switching control cell detecting section 333, the buffer control section 332 sets a control stop mode and stops the discard priority control. Also, the buffer control section 332 reads out and discards cells stored in the cell buffer 331 together with the switching control cell. In addition, the buffer control section 332 stops the reading operation from the cell buffer 331 in the control stop mode. When receiving a second detection notice signal S336 from the second switching control cell detecting section 324 in the currently acting system switch section 320, the buffer control section 322 resets the normal mode to restart the discard priority control. The first switching control cell detecting section 333 detects the switching control cell in the cell sequence of the input signal S331 to generate the first detection notice signal S333 to the buffer control section 332. The first switching control cell generating section 334 communicates with the first switching control cell generating section 334 to adjust the timing of supply of the switching control cells.

The operations of the switching control cell generating section 334, a cell buffer 331, a buffer control section 332, and a first switching control cell detecting section 333 are the same as those of the switching control cell generating section 111, cell buffer 131, buffer control section 132, and first switching control cell detecting section 133 in the first embodiment.

It should be noted that the hitless switching system generally has the cell buffer 331 and the buffer control section 332 for every input interface section 310 and for every output interface section 340. However, in the example shown in FIG. 3, a set of the cell buffers 331 and the buffer control section 332 are provided in correspondence to one input interface section 310 and one output interface section 340.

The output interface section 340 includes a selecting circuit 341 selects one of an input signal S322 from the currently acting system switch section 320 and an input signal S332 from hot standby system switch section 330 in accordance with a selection signal from the apparatus monitoring section (not shown) and outputs the selected signal as an output signal S341.

Next, the hitless switching system according to the fourth embodiment of the present invention will be described with reference to FIGS. 9A and 9B.

Figure 9A:
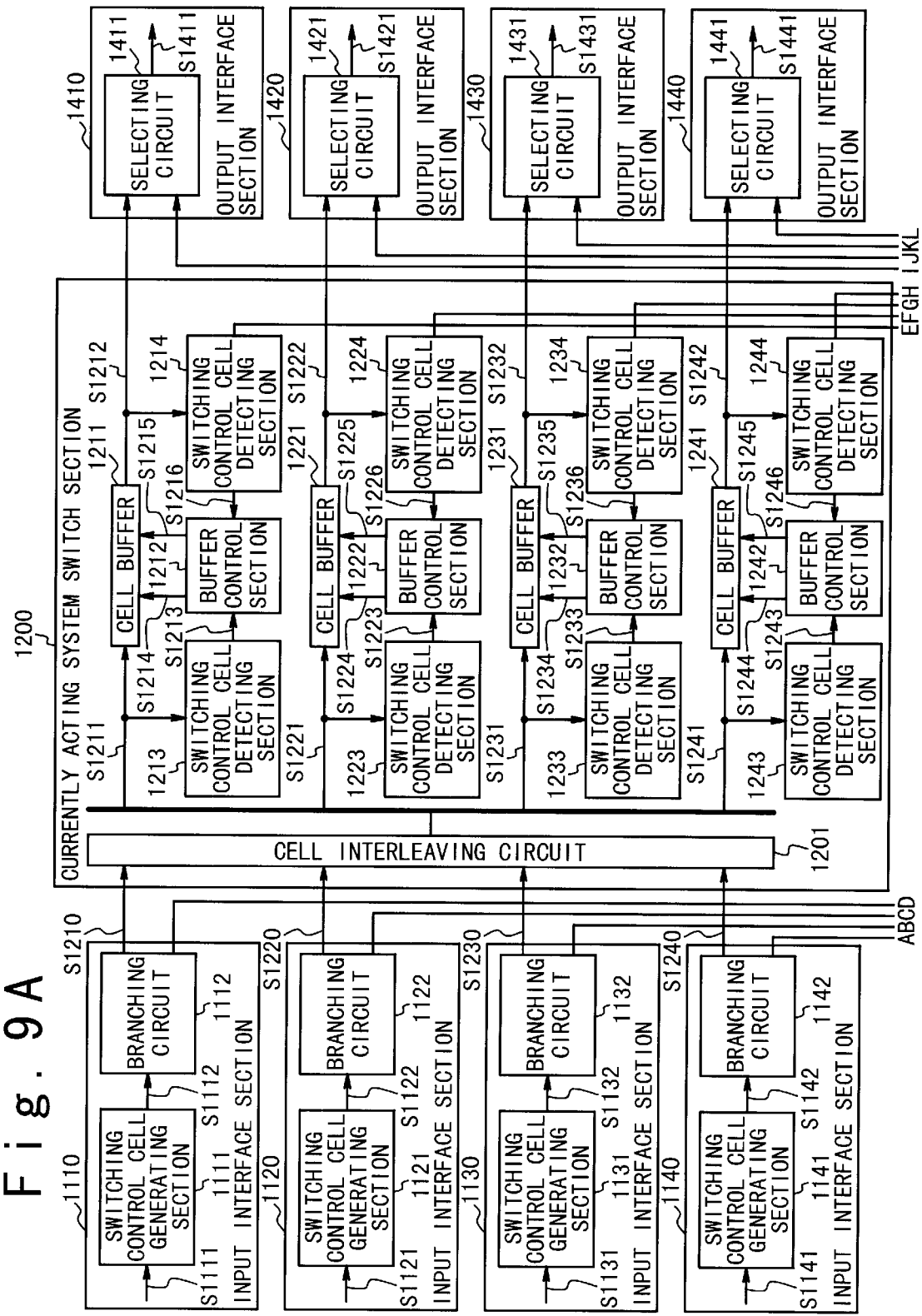
FIGS. 9A and 9B are block diagrams illustrating the structure of the hitless switching system of an ATM switch apparatus according to a fourth embodiment of the present invention.
Figure 9B:
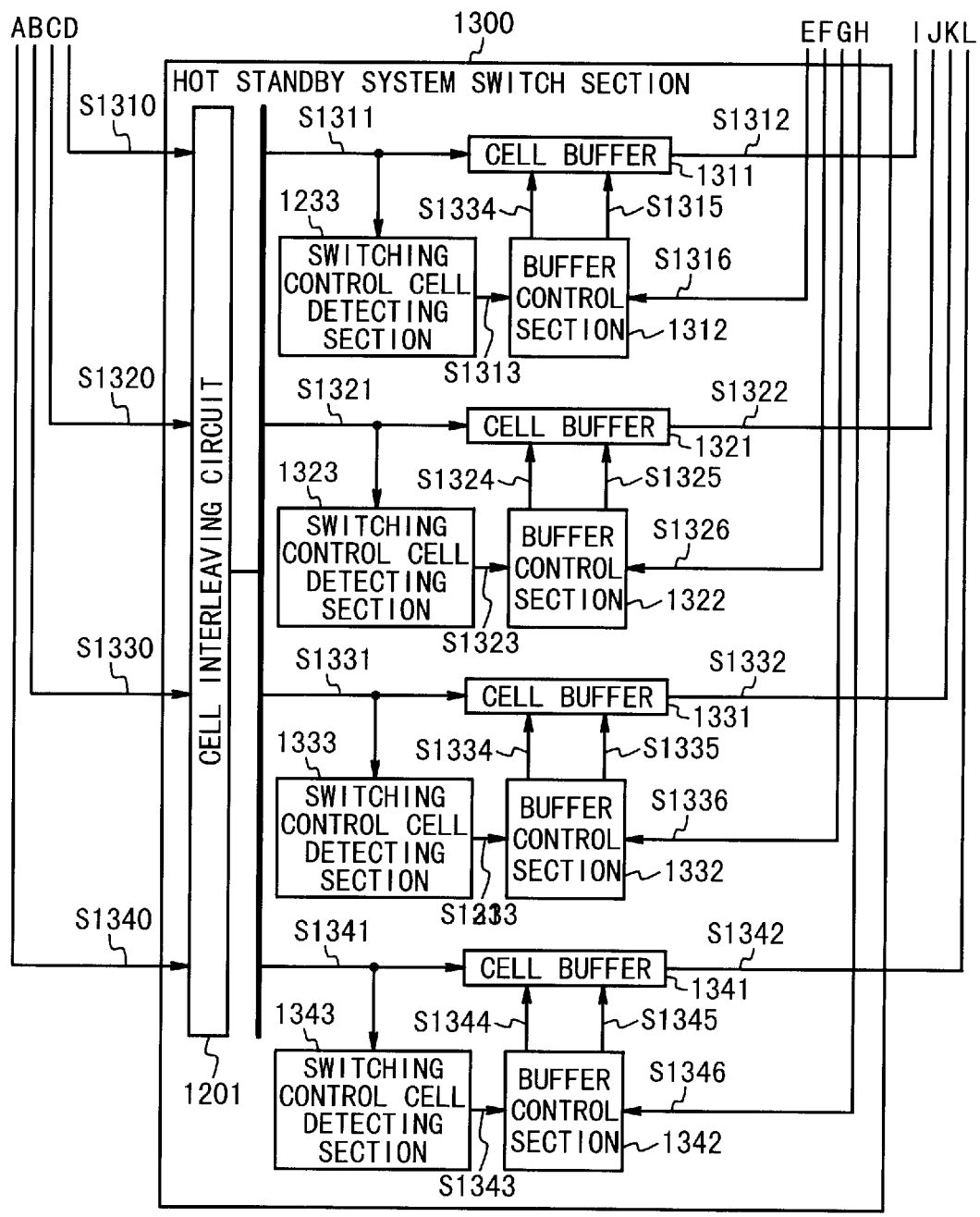

FIGS. 9A and 9B are block diagrams illustrating of the hitless switching system of the output buffer-type switch of 4×4 in the fourth embodiment. In the output buffer-type switch, the cell buffers are provided for the output interface sections, respectively.

Referring to FIGS. 9A and 9B, the hitless switching system in the fourth embodiment is composed of four input interface sections 1110 to 1140, currently acting system switch section 1200, hot standby system switch section 1300, and four output interface sections 1410 to 1440.

The input interface sections 1110 to 1140 are composed of switching control cell generating sections 1111 to 1141 and branching circuits 1112 to 1142, respectively, like the structure shown in FIG. 3. The currently acting system switch section 1200 is composed of cell buffers 1211 to 1241, buffer control sections 1212 to 1242, first switching control cell detecting sections 1213 to 1243 and second switching control cell detecting sections 1214 to 1244 in correspondence to the four output interface sections 1410 to 1440, respectively. Further, the currently acting system switch section 1200 is composed of a cell interleaving circuit 1201 to perform time divisional interleaving to input signals S1210 to S1240 supplied from the respective input interface sections 1111 to 1140.

The hot standby system switch section 1300 is composed of cell buffers 1311 top 1341, buffer control sections 1312 to 1342, first switching control cell detecting sections 1313 to 1343 and second switching control cell detecting sections 1314 to 1344 in correspondence to the four output interface sections 1410 to 1440, respectively. Further, the hot standby system switch section 1300 is composed of a cell interleaving circuit 1301 to perform time divisional interleaving to input signals S1310 to S1340 supplied from the respective input interface sections 1111 to 1140.

The respective output interface sections 1410 to 1440 are composed of selecting circuits 1411 to 1441, respectively, like the structure shown in FIG. 3.

In this case, if there are not the cell interleaving circuit 1201 in the currently acting system switch section 1200 and the cell interleaving circuit 1301 in the hot standby system switch section 1300, the system in the fourth embodiment is designed such that four sets of the currently acting system switch section 1200 and the hot standby system switch section 1300 shown with FIG. 3 are provided in parallel.

The cell interleaving circuits 1201 and 1301 performs time division interleaving to input signals S1210 to S1240 and S1310 to S1340 supplied from the input interface sections 1110 to 1140 to output as signals S1201 and S1301. In this case, the transmission rate of the output signal S1201 or S1301 is 4 times the transmission rate of the input signal. Cells from all input interface sections 1110 to 1140 are transmitted as the signal S1201 or S1301. Bus lines are formed in the switch section 1200 or 1300 and the cells are equally supplied to the respective cell buffers 1211 to 1241 or 1311 to 1341 as signals S1211, S1221, S1231 and S1241 or S1311, S1221, S1231 or S1241.

Of the cells supplied to the respective cell buffers 1211 to 1241 or 1311 to 1341, each of the buffer control sections 1212 to 1242 or 1312 to 1342 writes in a corresponding one of the cell buffers 1211 to 1241 or 1311 to 1341, only the cells which should be outputted to a one connected thereto of the output interface sections 1410 to 1440. The other cells are discarded. In this way, by the writing control to the cell interleaving circuits 1201 and 1301 and the cell buffers 1211 to 1241 and 1311 to 1341, a switching function or a cell separating function is realized. If the cells which should be outputted to the output interface sections 1410 to 1440 connected to the cell buffers 1211 to 1241 and 1311 to 1341 in this state are made to correspond to the input cells for the cell buffers 121 and 131 shown in FIG. 3, the structure shown in FIGS. 9A and 9B becomes equivalent to the provision of four sets of the circuits, each of which is shown in FIG. 3, in parallel. Therefore, because the operation of the circuit is equal to the operation of the circuit in the first embodiment, the description is omitted.

Also, referring to FIGS. 9A and 9B, because the switching control cell outputted from either of the input interface sections is interleaved and then outputted as the signal S1201, the switching control cell may be outputted from any one of the input interface sections.

As described above, according to the present invention, the hitless switching can be performed to the ATM switch with the discard priority control function. This is because the discard priority control is stopped during the cell count matching process in the present invention, so that it can be avoided that the cell discarding based on the discard threshold value occurs only in one of the switch sections.

What is claimed is:

1. A hitless switching system in an asynchronous transfer mode (ATM) apparatus, comprising:
    a first system switch section having a first cell buffer and set as a current acting system switch section, wherein said first system switch section sequentially stores a sequence of cells in said first cell buffer to sequentially output the stored cells from said first cell buffer while performing a discard priority control to said sequence of cells, and stops the discard priority control when a switching control cell is detected in said sequence of cells; and
    a second system switch section having a second cell buffer and set as a hot standby system switch section, wherein said second system switch section sequentially stores said input sequence of cells in said second cell buffer to sequentially output the stored cells from said second cell buffer while performing the discard priority control to said sequence of cells, and when said switching control cell is detected in said input cells, and stops the discard priority control and discards the stored cells from said second cell buffer together with the switching control cell,
    wherein said first system switch section sequentially outputs stored cells from said first cell buffer, sets a first mode of said first system switch section when said switching control cell is detected as one of said sequence of cells, stores said sequence of cells in said first cell buffer in said first mode while stopping said discard priority control to said sequence of cells, and selectively stores said sequence of cells in said first cell buffer in a state in which said first mode is not set while performing said discard priority to said sequence of cells, and
    wherein said second system switch section does not output stored cells from said second cell buffer in a second mode and sequentially outputs the stored cells from said second cell buffer when said second mode is not set, sets said second mode when said switching control cell is detected in said sequence of cells to said second cell buffer, discards the stored cells from said second cell buffer together with said switching control cell when said second mode is set, stores said sequence of cells in said second cell buffer in said second mode while stopping said discard priority control to said sequence of cells, and selectively stores said sequence of cells in said second cell buffer in a state in which said second mode is not set while performing said discard priority control to said sequence of cells.

2. A hitless switching system according to claim 1, further comprising an input interface section which includes:
    a switching control inserting section for generating said switching control cell in response to an insert instruction and inserting said switching control cell in a sequence of cells; and
    a branching circuit for supplying said sequence of cells to said first system switch section and said second system switch section.

3. A hitless switching system according to claim 2, wherein said first system switch section includes:
    said first cell buffer;
    a first detecting section for detecting said switching control cell in said sequence of cells to said first cell buffer to generate a first detection signal;
    a second detecting section for detecting said switching control cell in said sequence of cells from said first cell buffer to generate a second detection signal; and
    a first control section for setting said first mode in response to said first detection signal, canceling said first mode in response to said second detection signal, storing said sequence of cells in said first cell buffer in said first mode while stopping said discard priority control, selectively storing said sequence of cells in said first cell buffer in a state in which said first mode is not set while performing said discard priority control to said sequence of cells, and sequentially outputting stored cells from said first cell buffer, and
    wherein said second system switch section includes:
    said second cell buffer;
    a third detecting section for detecting said switching control cell in said sequence of cells to said second cell buffer to generate a third detection signal; and
    a second control section for setting said second mode in response to said third detection signal, discarding the stored cells from said second cell buffer together with said switching control cell when said second mode is set, storing said sequence of cells in said second cell buffer in said second mode while stopping said discard priority control, selectively storing said sequence of cells in said second cell buffer in a state in which said second mode is not set while performing said discard priority control to said sequence of cells, and sequentially outputting stored cells in said second cell buffer in the state in which said second mode is not set.

4. A hitless switching system according to claim 3, further comprising an output interface section which includes a selecting circuit for selecting one of the cells outputted from said first system switch section and the cells outputted from said second system switch section in response to a selection control signal.

5. A hitless switching system according to claim 2, wherein said first system switch section includes:

said first cell buffer;
a first detecting section for detecting said switching control cell in said sequence of cells to said first cell buffer to generate a first detection signal;
a first control section for setting said first mode in response to said first detection signal, canceling said first mode in response to a second detection signal, storing said sequence of cells in said first cell buffer in said first mode while stopping said discard priority control, selectively storing said sequence of cells in said first cell buffer in a state in which said first mode is not set while performing said discard priority control to said sequence of cells, and sequentially outputting stored cells from said first cell buffer, and
wherein said second system switch section includes:
said second cell buffer;
a third detecting section for detecting said switching control cell in said sequence of cells to said second cell buffer to generate a third detection signal; and
a second control section for setting said second mode in response to said third detection signal, canceling said second mode in response to said second detection signal, discarding the stored cells in said second cell buffer together with said switching control cell when said second mode is set, storing said sequence of cells in said second cell buffer in said second mode while stopping said discard priority control, selectively storing said sequence of cells in said second cell buffer in a state in which said second mode is not set while performing said discard priority control to said sequence of cells, and sequentially outputting stored cells from said second cell buffer in a state in which said second mode is not set.

6. A hitless switching system according to claim 5, further comprising an output interface section which includes:
a selecting circuit for selecting one of the cells outputted from said first system switch section and the cells outputted from said second system switch section in response to a selection control signal; and
a second detecting section for detecting said switching control cell in said sequence of cells from said first cell buffer to generate said second detection signal.

7. A hitless switching system according to claim 1, further comprising an input interface section which includes:
a branching circuit for supplying said sequence of cells to said first system switch section and said second system switch section.

8. A hitless switching system according to claim 7, wherein said first system switch section includes:
said first cell buffer;
a switching control inserting section for generating said switching control cell in response to an insert instruction and inserting said switching control cell in said sequence of cells including said first and second cells;
a first detecting section for detecting said switching control cell in said sequence of cells to said first cell buffer to generate said first detection signal;
a second detecting section for detecting said switching control cell in said sequence of cells from said first cell buffer to generate said second detection signal; and
a first control section for setting said first mode in response to said first detection signal, canceling said first mode in response to said second detection signal, storing said sequence of cells in said first cell buffer in said first mode while stopping said discard priority control, selectively storing said sequence of cells in said first cell buffer in a state in which said first mode is not set while performing said discard priority control to said sequence of cells, and sequentially outputting stored cells from said first cell buffer, and
wherein said second system switch section includes:
said second cell buffer;
a switching control inserting section for generating said switching control cell in response to an insert instruction and inserting said switching control cell in said sequence of cells including said first and second cells;
a third detecting section for detecting said switching control cell in said sequence of cells to said second cell buffer to generate said third detection signal; and
a second control section for setting said second mode in response to said third detection signal, canceling said second mode in response to said second detection signal, discarding the stored cells from said second cell buffer together with said switching control cell when said second mode is set, storing said sequence of cells in said second cell buffer in said second mode while stopping said discard priority control, selectively storing said sequence of cells in said second cell buffer in a state in which said second mode is not set while performing said discard priority control to said sequence of cells, and sequentially outputting stored cells from said second cell buffer in the state in which said second mode is not set.

9. A hitless switching system according to claim 8, further comprising an output interface section which includes a selecting circuit for selecting one of the cells outputted from said first system switch section and the cells outputted from said second system switch section in response to a selection control signal.

10. A hitless switching system according to claim 1, wherein said hitless switching system comprises a plurality of sets of said first system switch section and said second system switch section, and
further comprises:
a plurality of input interface sections, each of which supplies a sequence of cells; and
a cell multiplexing circuit for supplying each of said plurality of sequences of cells to a corresponding one of said plurality of sets of said first system switch section and said second system switch section.

11. A hitless switching method in an asynchronous transfer mode (ATM) apparatus, comprising the steps of:
sequentially outputting stored cells in a first cell buffer of a first system switch section;
setting a first mode when a switching control cell is detected as an input cell to said first cell buffer;
storing a sequence of cells in said first cell buffer in said first mode while stopping a discard priority control;
selectively storing said sequence of cells in said first cell buffer in a state in which said first mode is not set while performing said discard priority control to said sequence of cells;
setting a second mode when said switching control cell is detected as an input cell to a second cell buffer;
sequentially outputting stored cells from said second cell buffer in a state in which said second mode is not set;
discarding the stored cells from said second cell buffer when said second mode is set;
storing said sequence of cells in said second cell buffer in said second mode while stopping said discard priority control to said sequence of cells;

selectively storing said sequence of cells from said second cell buffer in the state in which said second mode is not set while performing said discard priority control to said sequence of cells; and selecting one of said cells sequentially outputted from said first cell buffer and said cells sequentially outputted from said second cell buffer.

12. A method according to claim 11, wherein said discard priority control has a high level and a low level, wherein said high level is associated with a storage capacity of said first or second cell buffers and said low level is associated with a part of said storage capacity of said first or second cell buffers.

13. A method according to claim 12, wherein said first cell buffer is equal to said second cell buffer in storage capacity.

14. A method according to claim 11, further comprising the step of inserting said switching control cell in said sequence of cells.

15. A method according to claim 11, further comprising the steps of:

generating said switching control cell in response to an insert instruction to insert in said sequence of cells; and supplying said sequence of cells to said first cell buffer and said second cell buffer.

16. A method according to claim 11, wherein said step of setting a first mode includes:

detecting said switching control cell in said sequence of cells to said first cell buffer to generate a first detection signal; and setting said first mode in response to said first detection signal.

17. A method according to claim 11, further comprising the steps of:

detecting said switching control cell in said sequence of cells outputted from one of said first cell buffer and said second cell buffer to generate a second detection signal; and canceling said first mode and said second in response to said second detection signal.

* * * * *